(12) United States Patent
Gust et al.

(10) Patent No.: US 6,351,929 B1
(45) Date of Patent: *Mar. 5, 2002

(54) TRIPLEX TRIM MOWER WITH LATERALLY ADJUSTABLE CUTTING UNITS

(75) Inventors: Jack R. Gust, Apple Valley; Daniel M. Treu, Eagan, both of MN (US)

(73) Assignee: The Toro Company, Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/489,253

(22) Filed: Jan. 21, 2000

Related U.S. Application Data

(63) Continuation-in-part of application No. 08/969,799, filed on Nov. 13, 1997, now Pat. No. 6,032,441.

(51) Int. Cl.$^7$ ............................................. A01D 34/44
(52) U.S. Cl. ............................................ 56/7; 56/15.5
(58) Field of Search .................... 56/6, 7, 249, 294, 56/252, 253, 15.2, 15.5, 14.9, 15.1

(56) References Cited

U.S. PATENT DOCUMENTS

| 1,069,736 A | 8/1913 | Shorman |
| 1,400,861 A | 12/1921 | Burgess |
| 2,178,467 A | 10/1939 | Brent ...................... 280/33.44 |
| 2,285,306 A | 6/1942 | Roseman ........................ 56/7 |

(List continued on next page.)

FOREIGN PATENT DOCUMENTS

| AU | B-27662/83 | 7/1989 |
| CA | 1278923 | 1/1991 |
| EP | 189619 | 8/1986 |
| EP | 324 970 B1 | 2/1992 |
| GB | 761572 | 11/1956 |
| GB | 1074691 | 7/1967 |
| GB | 324 970 | 2/1992 |
| JP | 57-94327 | 11/1955 |
| JP | 60-160119 | 4/1984 |
| JP | 62-187535 | 11/1987 |
| JP | 2711125 | 2/1998 |
| WO | WO 87/06792 | 11/1987 |

*Primary Examiner*—Robert E. Pezzuto
(74) *Attorney, Agent, or Firm*—James W. Miller

(57) ABSTRACT

A triplex trim mower (100) including a vehicle (102) having two front drive wheels (104) and one rear steerable wheel (106). Mounted generally forward of the front wheels (104) are two reel-type cutting units (108a) laterally offset about the longitudinal axis (110) of the vehicle (102). Mounted between the front and rear wheels and substantially centered between the forward cutting units (108a) is a rear reel-type cutting unit (108b). A lateral support frame (137) is incorporated into the main frame of traction vehicle (102). The cutting units (108) are supported by a lateral carrier frame (144) which is slidably engaged to lateral support frame (137) such that carrier frame (144) can move laterally relative to support frame (137). A hydraulic cylinder (158) permits carrier frame (144) to be laterally displaced under operator command. Second and third hydraulic cylinders (131) permit cutting units (108) to be moved between a transport position and an operating position. A single joystick (118) permits the operator to control all aspects of cutting unit position including transport or operating position and lateral offset position. The reel-type cutting units (108a and 108b) can be replaced with rotary cutting units (208 and 208b).

21 Claims, 18 Drawing Sheets

U.S. PATENT DOCUMENTS

| | | | |
|---|---|---|---|
| 2,515,662 A | 7/1950 | Norton | 56/234 |
| 2,574,725 A | 7/1951 | Berdan | 56/26 |
| 2,609,650 A | 9/1952 | Lindquist | 56/23 |
| 2,743,567 A | 5/1956 | Martin | 56/6 |
| 2,764,864 A | 10/1956 | Kinkead | 56/7 |
| 2,882,978 A | 4/1959 | Smith et al. | 172/79 |
| 3,023,561 A | 3/1962 | Gustafson | 56/25.4 |
| 3,034,274 A | 5/1962 | Webb | 56/6 |
| 3,040,502 A | 6/1962 | Smith et al. | 56/6 |
| RE25,379 E | 5/1963 | Swanson | 56/25.4 |
| 3,090,184 A | 5/1963 | Hadek | 56/7 |
| 3,757,500 A | 9/1973 | Averitt | 56/6 |
| 3,832,834 A | 9/1974 | Kovacs | 56/6 |
| 3,893,283 A | 7/1975 | Dandl | 56/6 |
| 3,910,016 A | 10/1975 | Saila et al. | 56/7 |
| 3,965,658 A | 6/1976 | van der Lely | 56/192 |
| 3,968,630 A | 7/1976 | Mitchell | 56/7 |
| 4,244,597 A | 1/1981 | Dandl | 280/473 |
| 4,255,919 A | 3/1981 | Copley et al. | 56/30 |
| 4,273,384 A | 6/1981 | Freeburn | 299/41 |
| 4,637,625 A | 1/1987 | Blackwell | 280/411 C |
| 4,715,168 A | 12/1987 | Oxley | 56/15.8 |
| 4,858,418 A | 8/1989 | von Allwoerden | 56/15.5 |
| 4,866,917 A | 9/1989 | Phillips et al. | 56/7 |
| 4,873,818 A | 10/1989 | Turner | 56/10.8 |
| 4,893,456 A | 1/1990 | Wallace | 56/15.5 |
| 4,949,534 A | 8/1990 | Evans | 56/6 |
| 5,483,787 A | 1/1996 | Berrios | 56/10.1 |
| 5,483,789 A | 1/1996 | Gummerson | 56/15.5 |
| 5,692,541 A | 12/1997 | Brown | 137/636.2 |

FIG. 2

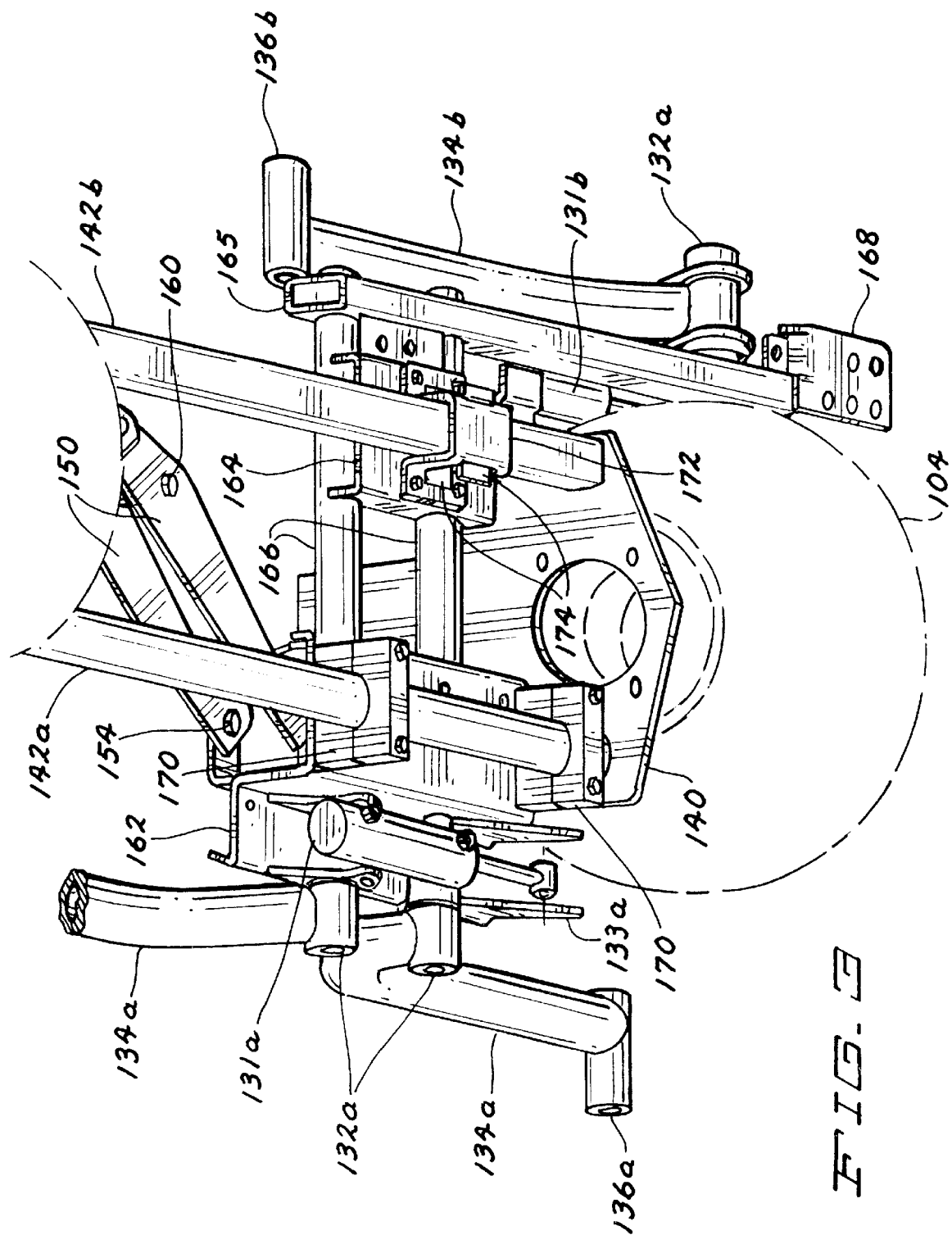

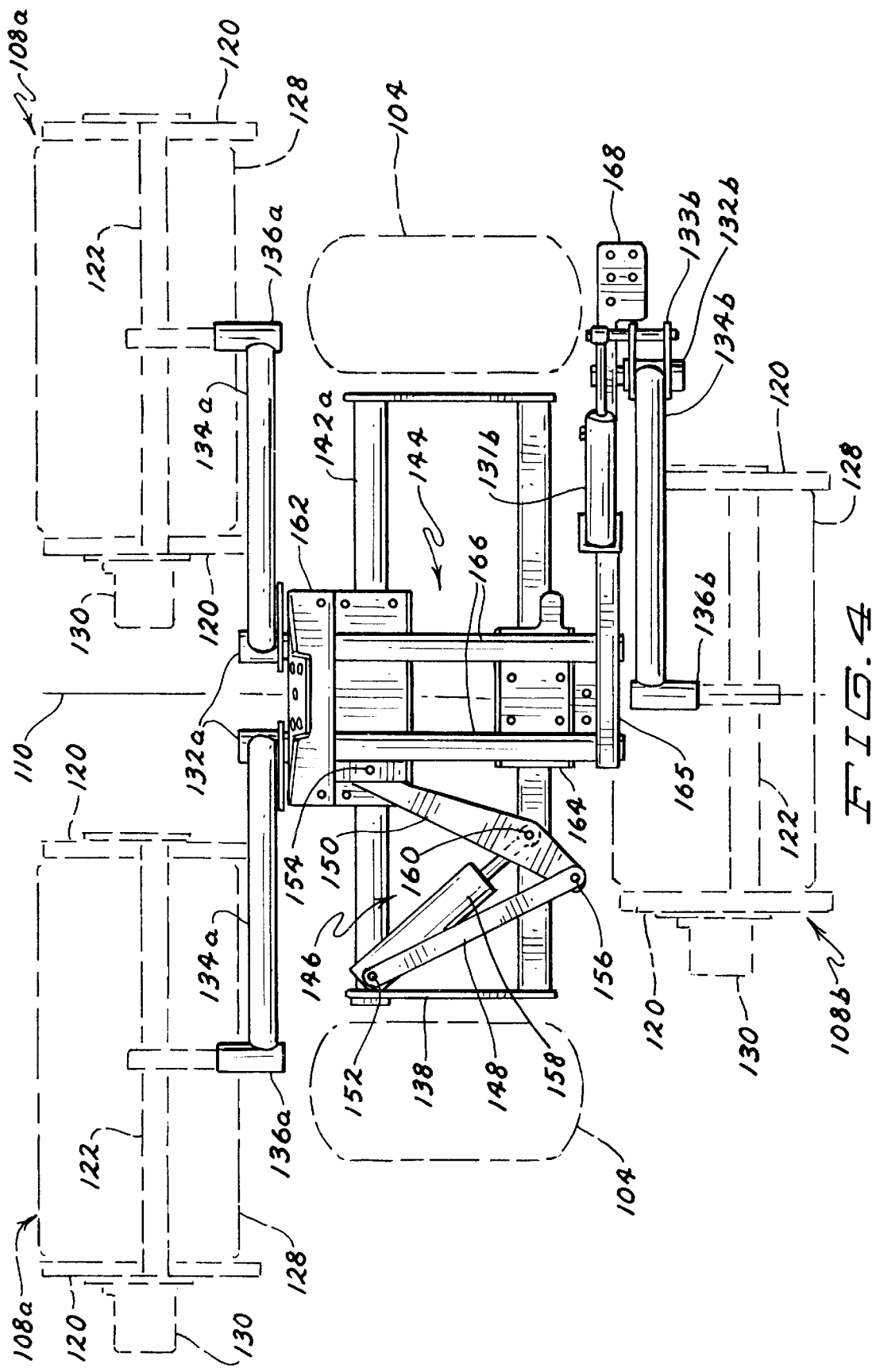

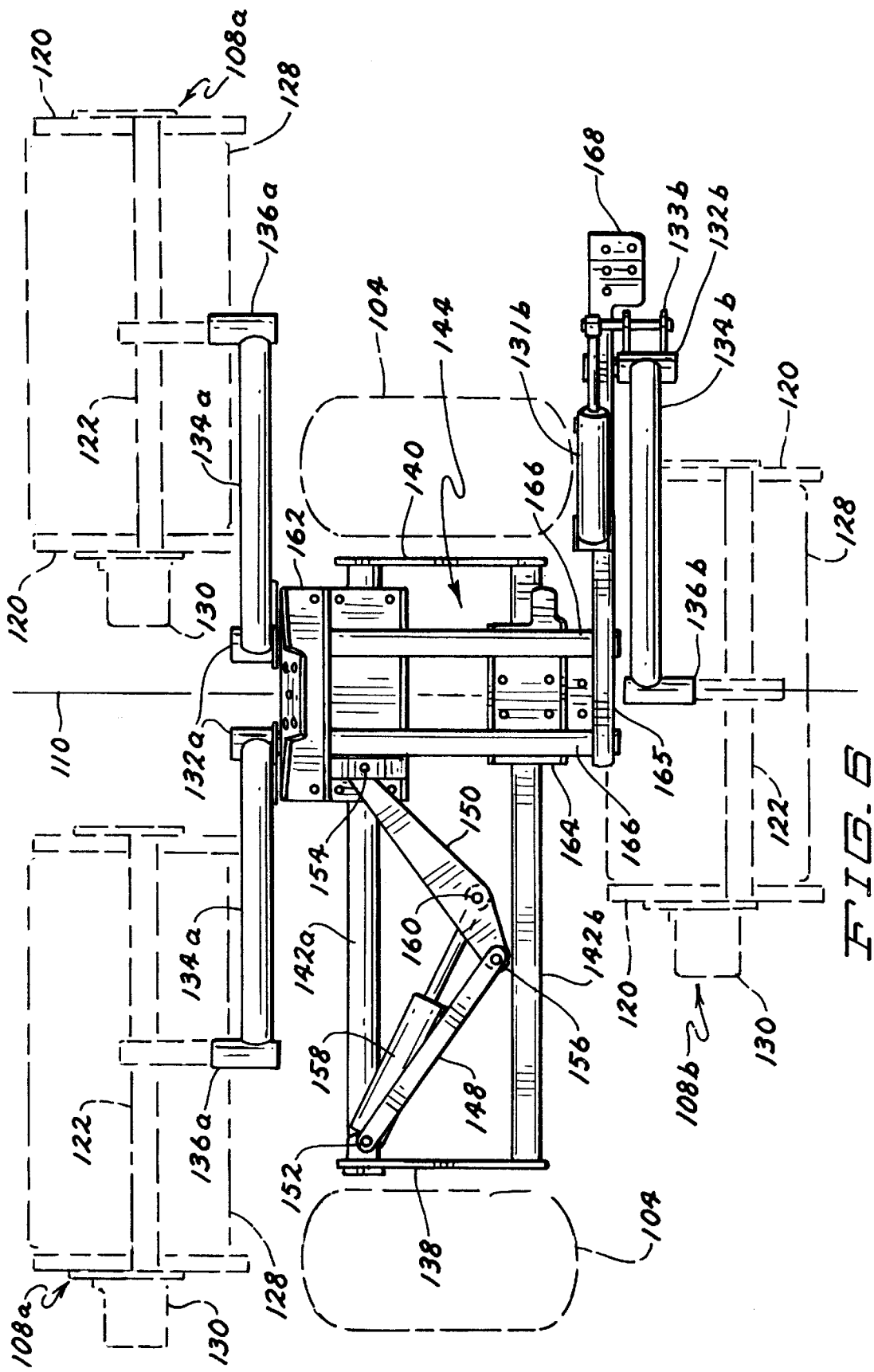

TRIPLEX TRIM MOWER WITH LATERALLY ADJUSTABLE CUTTING UNITS

CROSS REFERENCE TO RELATED APPLICATIONS

This application is a continuation-in-part of application Ser. No. 08/969,799, filed Nov. 13, 1997, now U.S. Pat. No. 6,032,441.

TECHNICAL FIELD

The present invention relates generally to turf maintenance equipment, and more particularly to a triplex trim mower with laterally adjustable cutting units.

BACKGROUND OF THE INVENTION

Many types of power turf mowing equipment are known. Such equipment can generally be classified by the type of cutting unit the particular mower employs. A rotary cutting unit includes one or more rigid steel blades rotated about a vertical axis within a housing or "cutting deck." The blades cut the grass at a predetermined height above the ground. On the other hand, a reel cutting unit includes a frame within which is mounted a rotating reel having a plurality of arcuate blades, the reel rotating about a generally horizontal axis. The rotating reel blades pass in close proximity to a bedknife which spans the cutting unit frame parallel to the reel axis. Grass is sheared as it passes between the reel blade and bedknife. While rotary cutting units are suitable for many purposes, it is generally perceived that reel cutting units provide a more precise cut. The present invention relates to reel-type mowers and the remainder of this discussion will focus accordingly.

Power turf mowing equipment can also be categorized based on the method used to propel the cutting units. Generally, there are walk-behind, riding, and towed turf mowers. The present invention relates primarily to riding turf mowers and specifically, those riding turf mowers with three reel-type cutting units, generally referred to as triplex mowers.

Triplex mowers typically include a traction vehicle supported by a plurality of wheels, including one or more traction wheels; a prime mover supported by the vehicle frame and connected through a transmission to the traction wheel(s); and three cutting units powered by the prime mover, two units mounted generally ahead of the front wheel(s) and laterally offset about the longitudinal or fore-and-aft axis of the vehicle, and one unit mounted generally between the front and rear wheels and centered about the vehicle longitudinal axis. Typically, the two forward cutting units of a triplex mower are symmetrically offset about the longitudinal axis of the traction vehicle, leaving an uncut section therebetween during operation. Being centered about the longitudinal axis of the vehicle, the rear cutting unit then spans the uncut section and overlaps the mowed path of both forward cutting units. Consistent mowing across the full span of the cutting units is thus obtained. When not cutting, the mower typically has the ability to raise the cutting units to a "transport" position.

Triplex turf mowers can further be differentiated by the particular mowing task they perform. A greens mower is generally a small, maneuverable mower with high-precision cutting units suitable for maintaining golf greens. These mowers often include a grass collection system to collect clippings. A second type of turf mower is the fairway mower. Reel-type fairway mowers are generally larger that greens mowers and often include five or more cutting units (e.g., "5-plex" mowers) for a wider mowed path. Finally, a trim mower is similar in size to the greens mower but is designed specifically to mow around tees and turf boundaries, e.g., around greens, sandtraps, and water.

The trim mower differs from the greens mower in other respects as well. For example, the greens mower is designed to provide a high precision cut on relatively flat, smooth turf. The trim mower, however, while slightly sacrificing quality of cut, can mow irregular turf such as intermediate roughs and inclines. The tires of the two mowers also differ. In order to traverse irregular turf, the tires of the trim mower must have adequate tread to ensure traction. The tires of the greens mower, on the other hand, usually have minimal tread in order to reduce possible damage to the green. Additionally, because of the more precise cut required of the greens mower, it typically operates at lower vehicle velocities than the trim mower. Thus, the trim mower and the greens mower, while similar in some respects, are each designed to address separate turf maintenance needs.

The present invention, as previously stated, is directed specifically to triplex trim mowers. Like the greens mower, the trim mower must be highly maneuverable to permit operation around irregular boundaries. Additionally, the overall cutting width of the trim mower must remain sufficiently narrow to permit passage between course impediments, e.g., landscaping and trees. As such, the front cutting units typically provide minimal lateral extension beyond the outer edge of each front wheel. While this configuration results in a nimble mower, there is a significant drawback. A historical problem with conventional trim mowers is that the operator must necessarily place the front wheel close to the boundary to be mowed. Typically, these boundaries can have sharp drop-offs (i.e., lower elevation) from the turf being mowed. For example, the boundaries of a sand trap are generally several inches below turf level. When mowing around such areas, the operator must ensure that the front wheel of the mower remains on the turf and does not drop over the boundary. That is, the operator must maintain a safe distance between the wheels and the boundary being mowed. Dropping a wheel, in addition to damaging the cutting units, can negatively affect the stability of the mower and possibly endanger the operator. Accordingly, at the completion of the mowing operation, it is often necessary to perform a subsequent trimming operation with either a hand mower or flexible line trimmer. This additional clean-up step is inconvenient and time-consuming.

These problems have been addressed in the past by merely increasing the width of the cutting units, thereby increasing the lateral extension beyond the front wheels. Unfortunately, longer cutting units make the mower wider and less maneuverable. Additionally, the ground-following capability of the cutting unit diminishes with increased length, resulting in uneven cutting. As such, increased cutting unit width has not resolved the issues regarding effective trim mower operation.

Thus, a mower providing increased lateral extension of the cutting units without sacrificing mower maneuverability or performance is highly desirable. The Applicants are aware of several devices that have sought to address this need in the context of non-trim mowers by providing laterally adjustable or laterally offset cutting units. As explained, though, these devices do not adequately address the unique requirements of the trim mower.

There are a number of non-trim mowers designed to laterally extend and retract the cutting unit(s) relative to the support vehicle. Many of these mowers utilize a single, side-mounted cutting unit. This configuration substantially increases mower width and therefore limits maneuverability, an undesirable consequence for a trim mower. For example, U.S. Pat. No. 2,882,978 issued to Smith et al, discloses a selectably slidable, laterally offset mower for trimming beneath overhanging obstacles such as low tree branches. U.S. Pat. No. 4,873,818, issued to Turner, is directed to a similar mower that provides increased offset capability.

Conventional riding mowers with singular, rotary cutting decks that may be laterally displaced relative to the vehicle are also known. For instance, U.S. Pat. No. 4,893,456 issued to Wallace, and U.S. Pat. No. 5,483,789 issued to Gummerson, show a single cutting deck that can be laterally displaced from a conventional centered position to a laterally extended position. However, neither of these inventions describes a method for laterally moving a plurality of separate reel-type cutting units in the context of a triplex trim mower.

Applicants are also aware of towed cutting units capable of lateral displacement relative to the vehicle. U.S. Pat. No. 3,090,184 to Hadek shows a towed gang mower wherein the central mowers move laterally relative to the rest of the gang. In U.S. Pat. No. 3,893,283 to Dandl, a towed gang of two cutting units is described wherein a trailing unit is pivotally mounted to a forward unit. The trailing unit may be selectively positioned about the latter to laterally displace the mowed path. However, the forward cutting unit remains fixed relative to the vehicle at all times.

Lastly, U.S. Pat. No. 4,866,917, issued to Phillips et al, discloses a triplex greens mower with a fixed offset reel arrangement. This particular mower is directed to the unique requirements of greens mowers. Typical greens maintenance involves an outer perimeter cut followed or preceded by parallel back-and-forth cuts over the remainder of the green. In the past, the perimeter cut required the mower to traverse roughly the same cutting path each time. As a result, some believe that compaction of the green may have occurred due to the repeated passing of the vehicle wheels over the same path. By providing an offset reel configuration, the Phillips invention allegedly allows the operator to reduce turf compaction by merely alternating the direction of the subsequent perimeter cut. Since the cut path is laterally offset from the wheel base, switching directions causes the wheels to follow a different path for the same cut. While potentially commendable in eliminating compaction of greens, the fixed relationship of the reels in the Phillips invention is not necessarily beneficial to trim mowers. For example, such a mower would be forced to traverse trim boundaries in a uniform direction to take advantage of the fixed offset cutting units. Due to the irregular nature and occurrence of obstructions encountered during trim mower operation, a fixed offset reel arrangement serves little if any benefit.

Thus, there is an unmet need for an improved mower that incorporates the superior cutting performance and maneuverability of the triplex trim mower with the ability to operate safely and effectively near trim boundaries. The triplex mower of the present invention addresses this problem.

SUMMARY OF THE INVENTION

Accordingly, one embodiment of the triplex trim mower of the present invention includes a traction vehicle; a lateral support frame attached to the undercarriage of the vehicle; three reel-type cutting units; a lateral carrier assembly supporting the cutting units and slidably engaged to the support frame, wherein the lateral carrier assembly can be laterally displaced relative to the support frame; means for selectively positioning the carrier assembly laterally along the support frame; and means for restraining the carrier assembly relative to the support frame.

Preferably, the lateral carrier assembly is a single lateral carrier frame supporting all three cutting units.

In the preferred embodiment, the positioning means and the restraining means are embodied in a single hydraulic cylinder.

The invention can also include a means for lifting the cutting unit(s) from an operating position to a transport position. In the preferred embodiment, the lifting means comprises a second hydraulic cylinder for lifting the front cutting units and a third hydraulic cylinder for lifting the rear cutting unit.

In still a further preferred embodiment, the hydraulic cylinders used to lift and laterally displace the cutting units are both controlled from a single joystick positioned near the operator.

Additional features and aspects of the present invention are described in detail below with reference to the Drawings.

BRIEF DESCRIPTION OF THE DRAWINGS

The invention will be further described with reference to the Drawings, wherein:

FIG. 1A is an enlarged perspective view of the joystick control lever of the trim mower of FIG. 1;

FIG. 2 is an enlarged perspective view of the cutting unit carrier system of the trim mower in FIG. 1;

FIG. 3 is an enlarged perspective view of a portion of the carrier system of FIG. 2;

FIG. 4 is a top plan view of the carrier system of FIG. 2 showing the carrier frame in the centered position;

FIG. 6 is a top plan view of the carrier system of FIG. 2 showing the carrier frame in the rightmost position;

DETAILED DESCRIPTION OF THE PREFERRED EMBODIMENT

Figure 1:
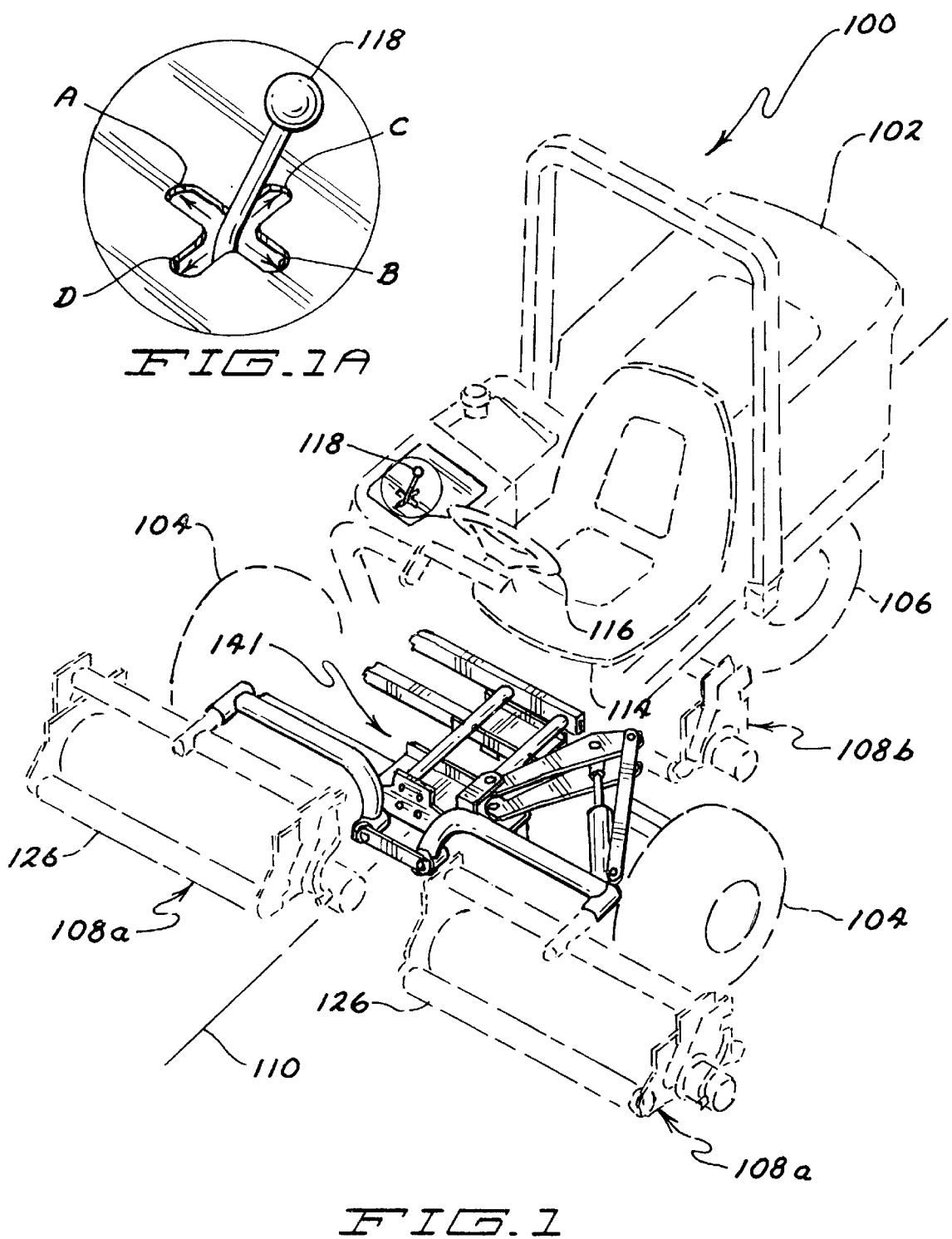
FIG. 1 is a perspective view of the triplex trim mower according to the invention.

With reference to the Drawings, wherein like reference numerals designate like parts and assemblies throughout the several views, FIG. 1 shows a perspective view of a preferred turf maintenance machine 100 according to the invention. Machine 100 includes a traction vehicle 102 including a main frame 137 (shown in FIG. 2) supported by a pair of front drive wheels 104 appropriately coupled through a transmission (not shown) to a prime mover (also not shown). A rear steerable wheel 106, which may or may not be powered, supports the rearward end of vehicle 102.

In its most preferred form, turf maintenance machine 100 is a high precision riding mower specifically intended for use as a triplex trim mower. In this embodiment, there are two front, reel-type cutting units 108a spaced along a line generally perpendicular to a fore-and-aft or longitudinal axis 110 of vehicle 102 and directly in front of drive wheels 104; and a single rear, reel-type cutting unit 108b roughly centered between front cutting units 108a and also arranged along a line which is generally perpendicular to longitudinal axis 110 of vehicle 102.

Referring generally to the Drawings, parts and assemblies performing the same function with respect to the front and rear cutting units are substantially identical and, as such, referred to with like reference numerals. Thus, the "a" and "b" suffixes will not hereafter be used unless necessary to clarify the invention.

In the embodiment shown in FIG. 1, an operator sits in an operator seat 114 and steers traction vehicle 102 by means of steering wheel 116 which, when turned, causes rear wheel 106 to pivot about a vertical axis, thereby steering the vehicle. Various levers and pedals permit the operator to control engine speed, brakes, etc. In particular, a joystick 118 provides positional control of cutting units 108. The prime mover powers one or more hydraulic pumps which provide(s) hydraulic fluid to the wheel and cutting unit motors, under control of various operator-controlled valves.

Although the particular construction of the reel units 108 is, for the most part, not central to the invention, the basic components will be described. Referring particularly to FIG. 4, a pair of generally rectangular side plates 120 are located at opposite ends of reel unit 108. Plates 120 are spanned at the top by a steel cross tube 122 and at the bottom by a rear roller (not shown) and a front roller 126 (shown in FIG. 1). The front roller can be a so-called "wiehle" roller, having a series of circumferential grooves across its entire width. Also spanning the side plates 120 is a horizontally centrally mounted rotatable reel 128 which is coupled to a hydraulic motor 130.

Cutting unit 108 also includes several shields (not shown) which help confine and direct the grass clippings. These shields are generally concentric to and offset from cutting reel 128. The standing grass blades are sheared off toward the bottom of the reel, at a stationary bedknife (not shown).

Figure 2:
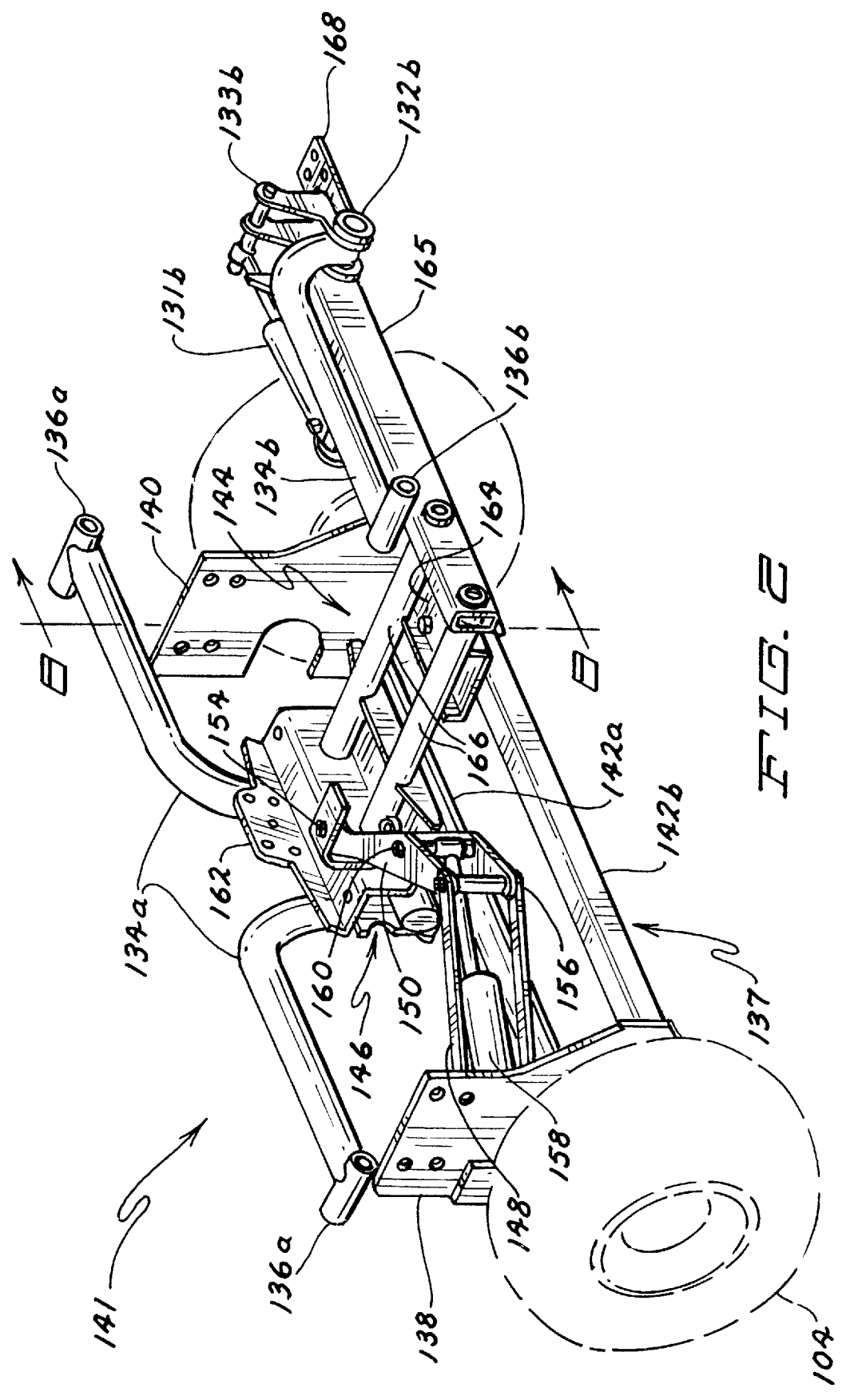

Per FIG. 4, each cutting unit 108 operably attaches to main frame 137 with a lift arm 134. Referring generally to FIGS. 2 and 3, each lift arm 134, at its "inboard" end, pivotally attaches to a carrier assembly 144 which is, in turn, operably connected to main frame 137. In the preferred embodiment, the carrier assembly comprises a single carrier frame 144 (described in detail below) supporting all three cutting units but a carrier assembly comprising two or more carrier frames is also possible within the scope of the present invention. At its opposite or "outboard" end, lift arm 134 pivotally attaches to cutting unit 108. A horizontal axis carrier pivot 132 permits each lift arm 134 to rotate in a generally vertical plane about carrier frame 144. A stem pivot 136, having an axis substantially parallel to pivot 132, allows each cutting unit 108 to pivot about lift arm 134. Thus, each cutting unit 108 may effectively pivot about joints 132 and 136. This range of freedom ensures that cutting units 108 maintain optimal ground contact across their width regardless of lateral variations in ground elevation.

Still referring to FIGS. 2 and 3, the operator may selectively raise cutting units 108 from a lowered or "operating" position to an elevated or "transport" position when the cutting units are not in use. In the preferred embodiment, this is accomplished with two hydraulic lift cylinders 131a and 131b. Situated between the two front lift arms, cylinder 131a is pivotally attached at its rod (actual rod attachment structure omitted in FIG. 3 for clarity) and at its cylinder to opposing bellcranks 133a located on lift arms 134a. When the operator commands joystick 118 to raise the cutting units, cylinder 131a extends, driving bellcranks 133a apart and thus, forcing lift arms 134a to rotate about pivot joints 132a. This motion raises the front cutting units from the operating to the transport position.

Rear cylinder 131b raises the single rear cutting unit 108b. Since only one lift arm is provided, cylinder 131b has its cylinder end operably mounted to carrier frame 144 and its rod end pivotally attached to a bellcrank 133b on rear lift arm 134b. Cylinder 134b operates in parallel with cylinder 134a such that the operator must give only one command to raise both the forward and rear cutting units. In the preferred embodiment, the rear cutting unit can be raised to its maximum transport position without interfering with vehicle 102.

Having described the cutting units, attention will now be focused on carrier frame 144 and its related structure.

Carrier Frame

Referring to the Drawings and particularly to FIGS. 2 and 3, the main frame of vehicle 102 includes a support frame 137. The support frame comprises: left frame side plate 138 and a right frame side plate 140 located immediately inboard of left and right front wheels 104 respectively; and a pair of frame members 142 spanning side plates 138 and 140. Front frame member 142a is circular in cross section and rear frame member 142b is square in cross section (however, the exact shape of these members is not critical). Slidably engaged to frame members 142 is carrier frame 144. Referring to FIGS. 4 and 6, a scissors frame 146 operably attaches to both carrier frame 144 and left side plate 138. Scissors frame 146 includes a first link 148 and a second link 150. First link 148 pivots about a frame pivot joint 152 proximal to side plate 138. Second link 150 pivots about a carrier pivot joint 154 at carrier frame 144. A scissors pivot joint 156 connects first link 148 to second link 150. Pivot joints 152, 154, and 156 each permit pivoting about a substantially vertical axis such that the scissors linkage moves within a plane which is parallel to the ground. Conventional bearings/bushings can be used to reduce friction at the pivot joints. Thus, a carrier system 141 comprising carrier frame 144, scissors frame 146 and support frame 137 is positioned on the front underside of vehicle 102.

Still referring to FIGS. 4 and 6, a double-acting hydraulic carrier cylinder 158 has its base end pivotally connected at pivot joint 152 and has its rod end pivotally attached to a rod pivot joint 160 located on link 150. By extending and retracting carrier cylinder 158, scissors frame 146 is displaced. Displacement of scissors frame 146 causes lateral motion of carrier frame 144 along frame tubes 142. That is, by extending and retracting carrier cylinder 158, the carrier frame and attached cutting units 108 are laterally displaced. In the preferred embodiment, carrier frame 144 (and the attached cutting units) can be selectively displaced 12 inches to either side of center. Table I below shows the preferred nominal dimensions and angles of the scissors frame in three different positions (centered, leftmost, and rightmost).

TABLE I

Figure 4A:
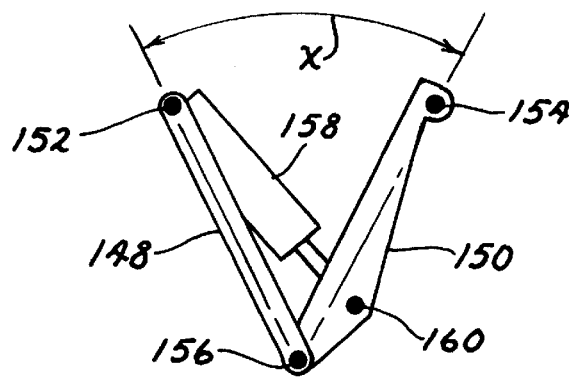
FIG. 4A is a top plan view of the scissors linkage of the carrier system of FIG. 4.
Figure 5A:
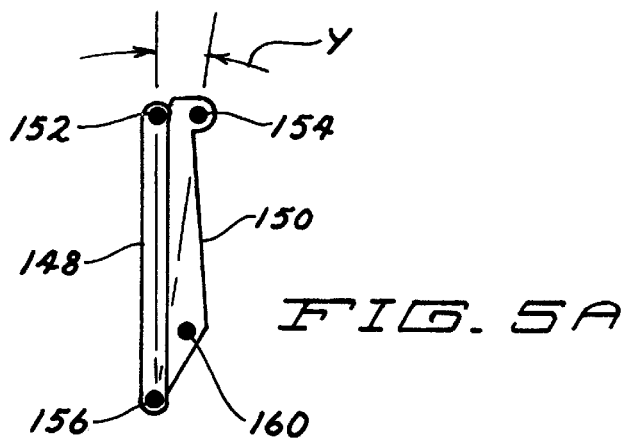
FIG. 5A is a top plan view of the scissors linkage of the carrier system of FIG. 5.
Figure 6A:
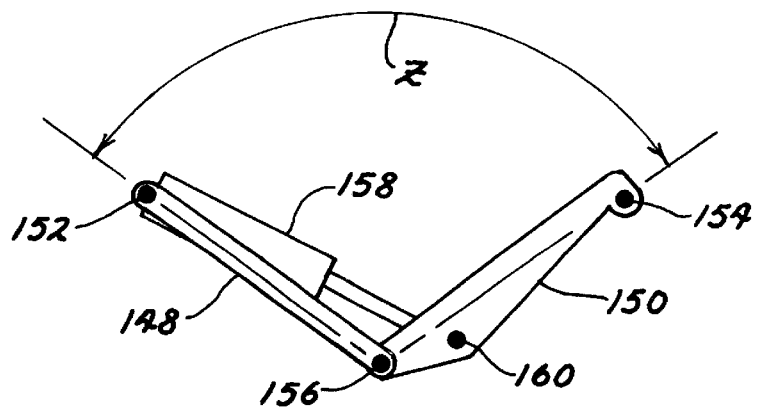
FIG. 6A is a top plan view of the scissors linkage of the carrier system of FIG. 6.

Dimensional Data,
See FIGS. 4A, 5A, 6A

| Item | Value |
| --- | --- |
| 148 (length) | 15.95 inches |
| 150 (length) | 16.08 inches |
| X (angle) | 53° |
| Y (angle) | 8° |
| Z (angle) | 110° |

Figure 5:
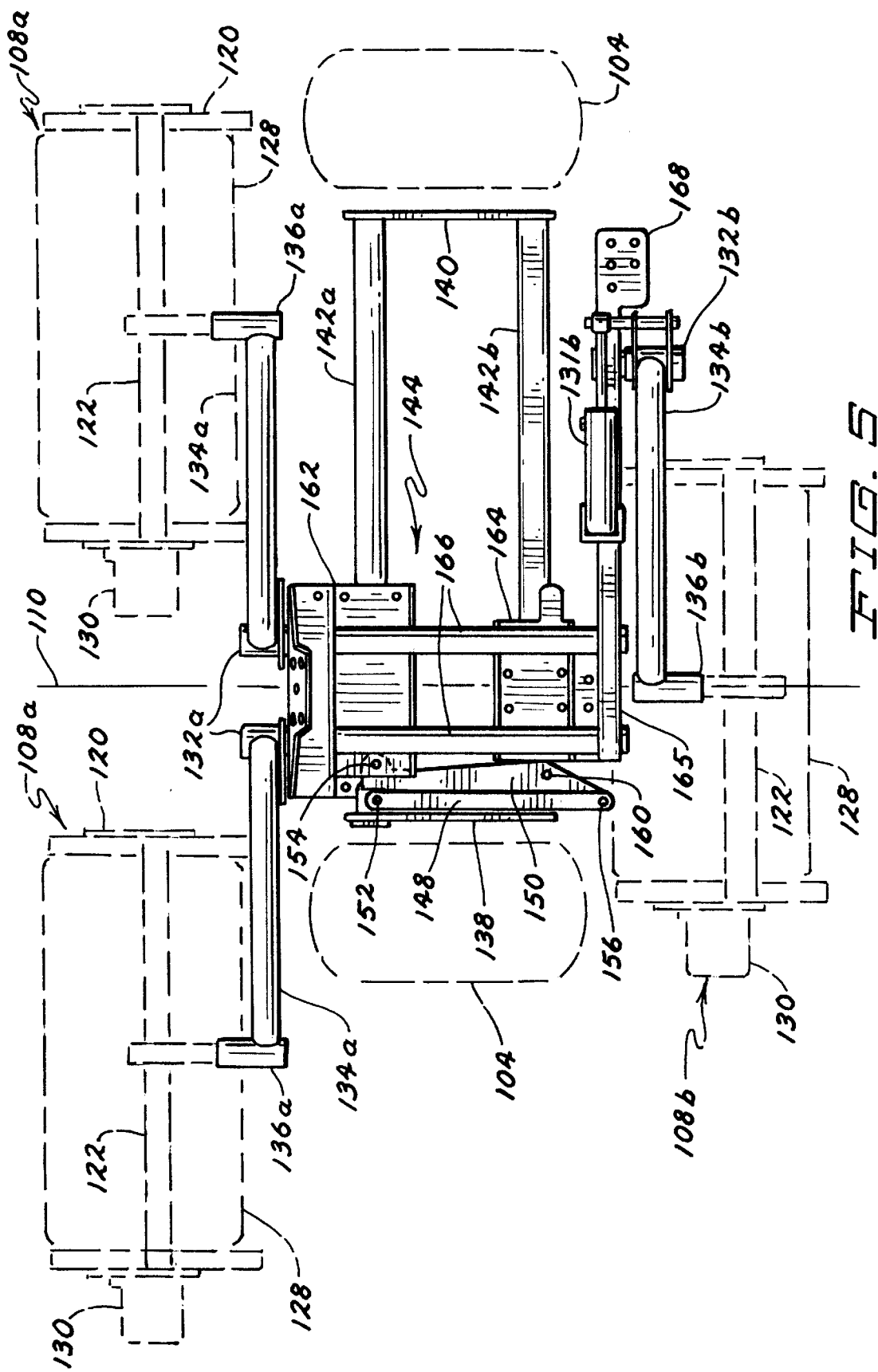
FIG. 5 is a top plan view of the carrier system of FIG. 2 showing the carrier frame in the leftmost position.

FIG. 5 shows a top plan view of carrier system 141. Carrier frame 144 comprises a forward beam 162, a rear beam 164, a rear beam extension 165, and two cylindrical struts 166 spanning forward beam 162 and rear beam 164. Forward beam 162 supports the forward lift arms 134a, cutting units 108a, and accompanying hydraulics components while rear beam 164 supports rear lift arm 134b, cutting unit 108b, beam extension 165, and accompanying hydraulic components including a hydraulic bulkhead 168 (attached at the end of beam extension 165) used to route all carrier frame hydraulics.

Referring generally to FIG. 3, a pair of bearings 170 slidably engaged to frame member 142a is rigidly attached to the lower side of forward beam 162. In the preferred embodiment, bearings 170 are polyphenylene sulfide (also known by the trade name "RYTON") blocks with a clearance bore for frame member 142a. However, other bearing materials may also be used. Each bearing block is split and the two halves are then bolted to forward beam 162. Bearings 170 align carrier frame 144 to frame member 142a.

Figure 8:
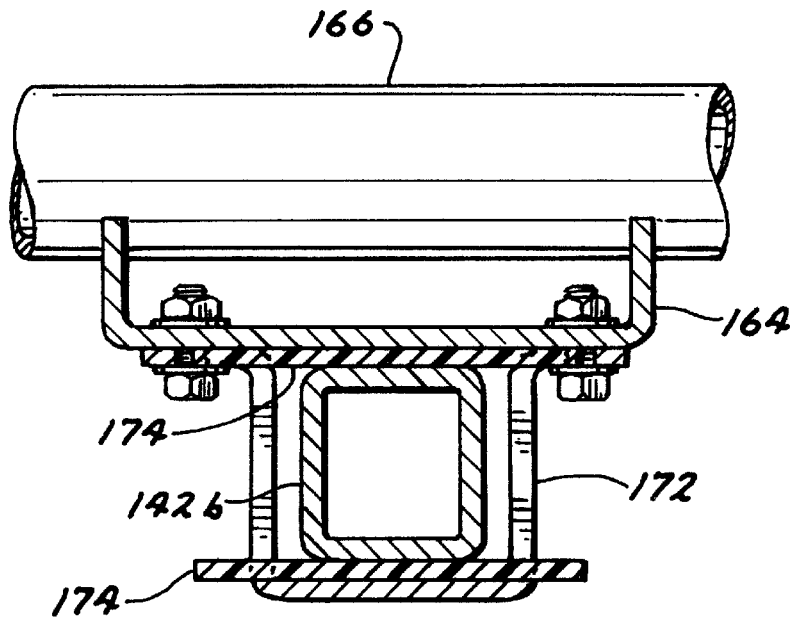
FIG. 8 is an enlarged partial section view of a portion of the carrier system of FIG. 2.
Figure 7:
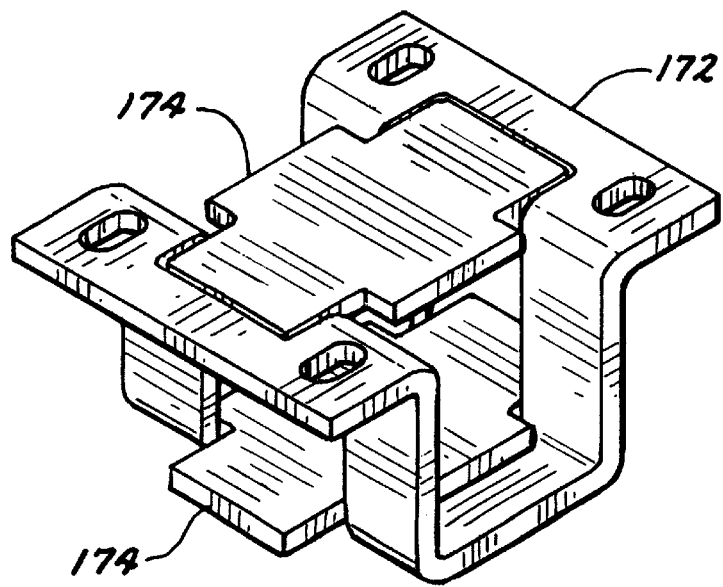
FIG. 7 is an enlarged perspective view of a portion of the carrier system of FIG. 2.

Referring to FIGS. 3, 7, and 8, a single, "U-shaped" rear slide support 172 encompassing frame member 142b is rigidly attached to the lower side of rear beam 164. Located intermediate to rear beam 164 and frame member 142b is a plastic slide 174. An identical slide is located between the lower side of frame member 142b and the inside bottom face of U-shaped bracket 172 as shown in FIGS. 7 and 8. Preferably, the plastic slides are "UHMW" polyethylene but other materials may also be acceptable. U-shaped bracket 172 and plastic slides 174 provide vertical support to the carrier frame but do not restrain carrier frame 144 in the fore-aft direction. Thus, bracket 172 and slides 174 allow for slight misalignment between frame members 142 yet still provide adequate support for carrier frame 144. The combination of low-friction bearings 170 and plastic slides 174 allows carrier frame 144 to slide laterally with limited resistance, even when bearing the full weight of the cutting units.

Carrier cylinder 158, lift cylinders 131, and hydraulic reel motors 130 are operably connected to a hydraulic pump (not shown) on traction vehicle 102. Hoses (not shown) for all hydraulic equipment on carrier frame 144 connect at a common bulkhead 168. Hose lengths are sized to allow unrestricted movement of carrier frame 144 and cutting units 108.

As described above, cutting units 108 can be positioned both laterally to traction vehicle 102 and vertically between the transport and operating positions. Either motion is controlled by the operator via joystick 118 shown in FIGS. 1 and 1A. That is, manipulation of joystick 118 permits the operator to laterally displace cutting units 108 to either the left or right as well as to the transport or operating positions. The joystick is operably connected to a hydraulic valve (not shown) having a first and a second spool. The first spool controls hydraulic flow to carrier cylinder 158 while the second spool controls hydraulic flow to cylinders 131. Each spool is biased to a centered position. In its centered position, each spool effectively blocks all hydraulic flow to and from its respective cylinder(s). This effectively "locks" the cylinder(s) in place. A mechanical linkage (not shown) operably connects each spool valve to joystick 118.

Joystick 118 is biased to its centered position by the biasing force of each spool valve. Thus, with no operator input, joystick 118 is centered (as shown in FIG. 1A) and each spool is in its centered position (thereby blocking flow to cylinders 158 and 131). The other positions of joystick 118 and the resultant spool actions are described below.

Operation

Figure 9:
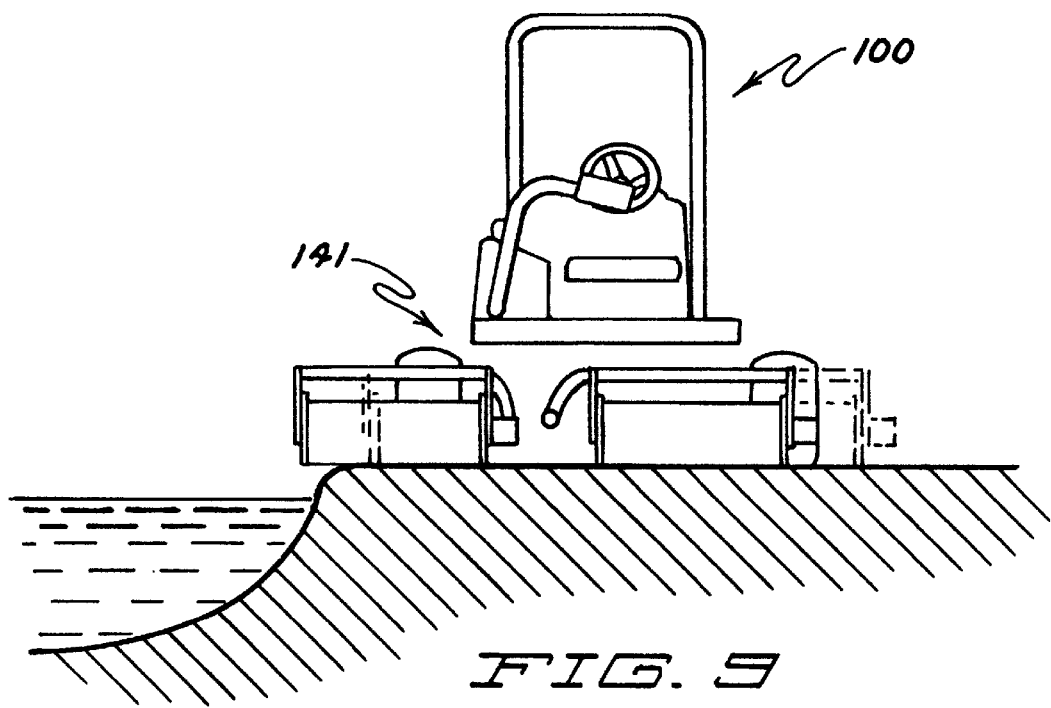
FIG. 9 is a front elevational view of the mower of FIG. 1 with the cutting units laterally displaced for mowing around a water boundary.

With the carrier frame in its centered or initial position as shown in FIG. 4, machine 100 is configured as a conventional triplex trim mower. However, unlike conventional mowers, upon approaching a trim boundary (e.g., water as shown in FIG. 9), the operator may laterally extend cutting units 108 to mow a path laterally offset from vehicle 102. For example, to extend the cutting units to the right, the operator selectively commands joystick 118 to a "right" position (depicted as position A in FIG. 1A). When this occurs, the first spool directs hydraulic flow to extend carrier cylinder 158. As the carrier cylinder extends, it forces scissors frame 146 to "open" (i.e., the scissors frame spreads) as shown in FIG. 6. As the scissors frame opens, carrier frame 144 (and thus, the attached cutting units) moves to the right along frame members 142. The operator may stop the travel of carrier frame 144 at any intermediate position by simply releasing joystick 118. Upon release of the joystick, the first spool is biased to its centered position, once again locking cylinder 158 in place. The biasing force of the first spool also forces joystick 118 to return to its centered position.

When the operator desires to laterally offset the cutting units to the left of vehicle 102, joystick 118 is commanded to a "left" position (depicted as position B in FIG. 1A). This causes the first spool to direct hydraulic flow to retract carrier cylinder 158. Referring to FIG. 5, retraction of the carrier cylinder causes scissors frame 146 to "close," pulling carrier frame 144 toward the left side of traction vehicle 102. Once again, the operator may stop the travel of the carrier frame at any intermediate position by simply releasing joystick 118. The hydraulic flow rate to and from cylinder 158 is restricted to slow the displacement rate of carrier frame 144. Preferably, the flow is restricted such that the carrier frame moves no faster than 8 inches/second at a supply pressure of 1000 psi (nominal). In the preferred embodiment, carrier cylinder 158 can laterally displace carrier frame 144 (and thus cutting units 108)±12 inches (12 inches to the left and 12 inches to the right), resulting in total lateral adjustability of 24 inches. Ideally, the cutting units can be laterally positioned during the mowing operation without damage to mower 100.

At the completion of the cutting operation, cutting units 108 can be raised to their transport position for travel to the next site. This is accomplished by selectively commanding joystick 118 to a rearward or "raise" position (depicted as position C in FIG. 1A). The mechanical linkage then shifts the second spool so that hydraulic flow is directed to extend lift cylinders 131, forcing lift arms 134 to rotate as previously described. Upon releasing the joystick, the second spool is biased to its centered position, effectively locking cutting units 108 in their transport position. Upon reaching the new site, joystick 118 can be commanded to a forward or "down" position (depicted as position D in FIG. 1A). The second spool then directs hydraulic flow to retract lift cylinders 131, returning cutting units 108 to their operating position. Placement of joystick 118 in either the C or D position has no affect upon the first spool (i.e., the cutting units can be raised without affecting their lateral position). Likewise, placement of the joystick in either the A or B position has no effect upon the second spool (i.e., the cutting units can be laterally displaced without affecting their up or down position). Thus, joystick 118 provides a simplified control interface that permits the operator to readily adjust cutting unit position.

To control cylinder extension/retraction speeds, the preferred embodiment utilizes various orifices (not shown). But proportional control valves could be used in place of the spools to allow more precise operator control of cutting unit position. Similarly, electrical switches and solenoid valves could be used in place of the present mechanical linkage and spool valves to translate joystick command to cutting unit position. However, Applicants believe the preferred embodiment is the most practical in terms of performance and cost.

Figure 10:
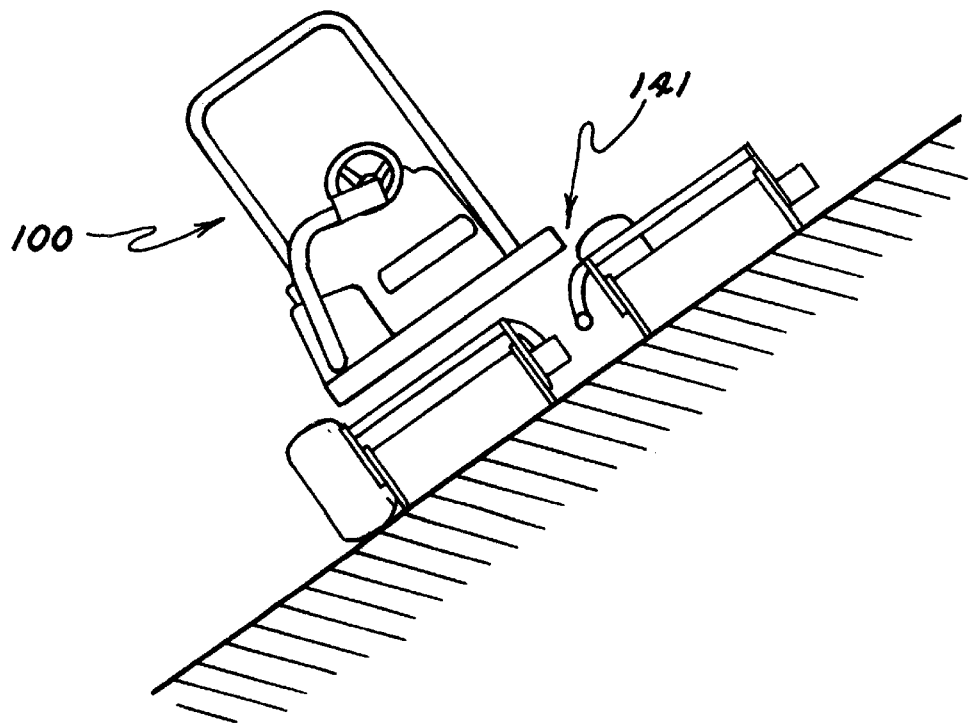
FIG. 10 is a front elevational view of the mower of FIG. 1 with the cutting units laterally displaced for inclined cutting.
Figure 11:
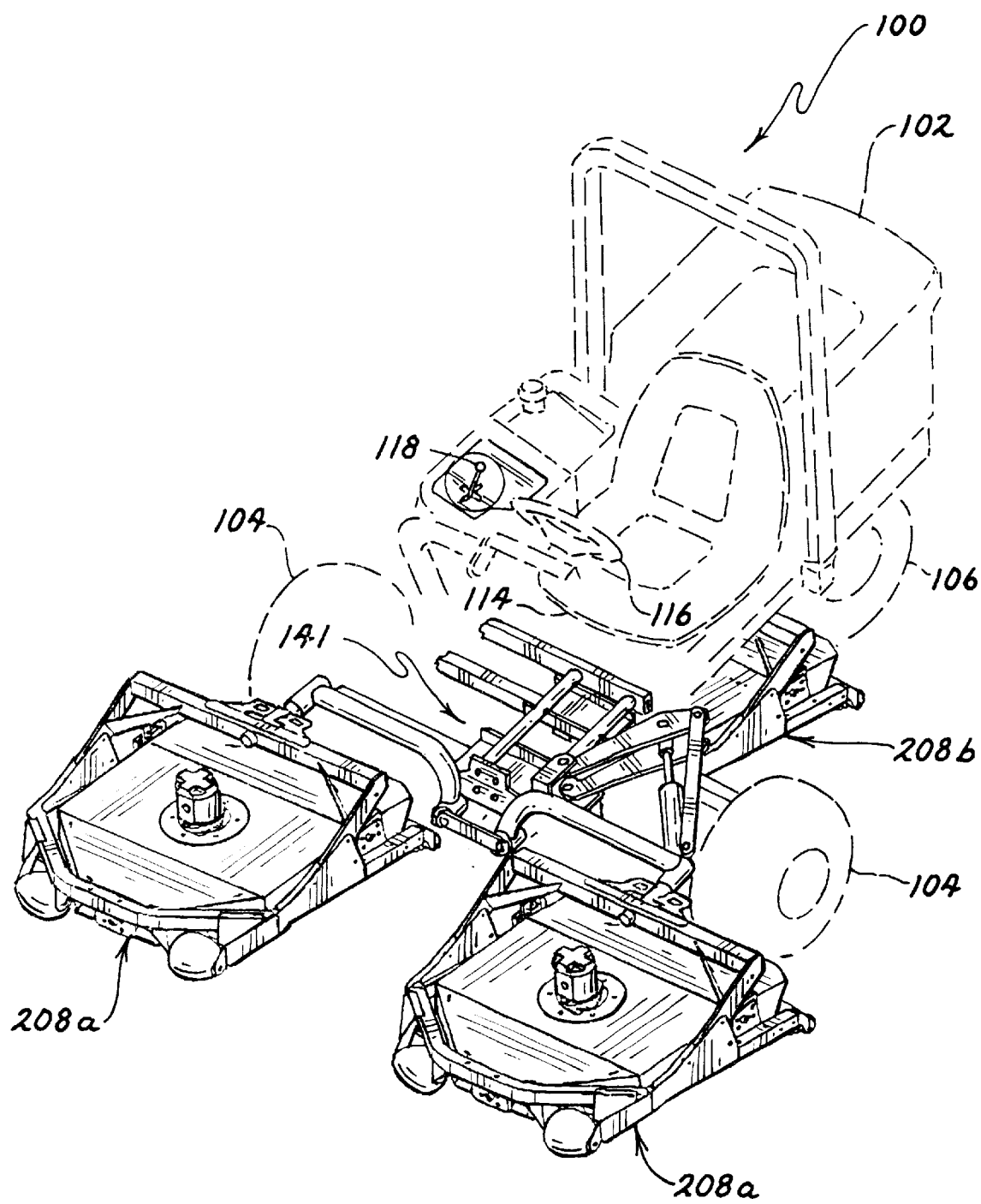
FIG. 11 is a perspective view of a second embodiment of a triplex trim mower according to the invention.
Figure 12:
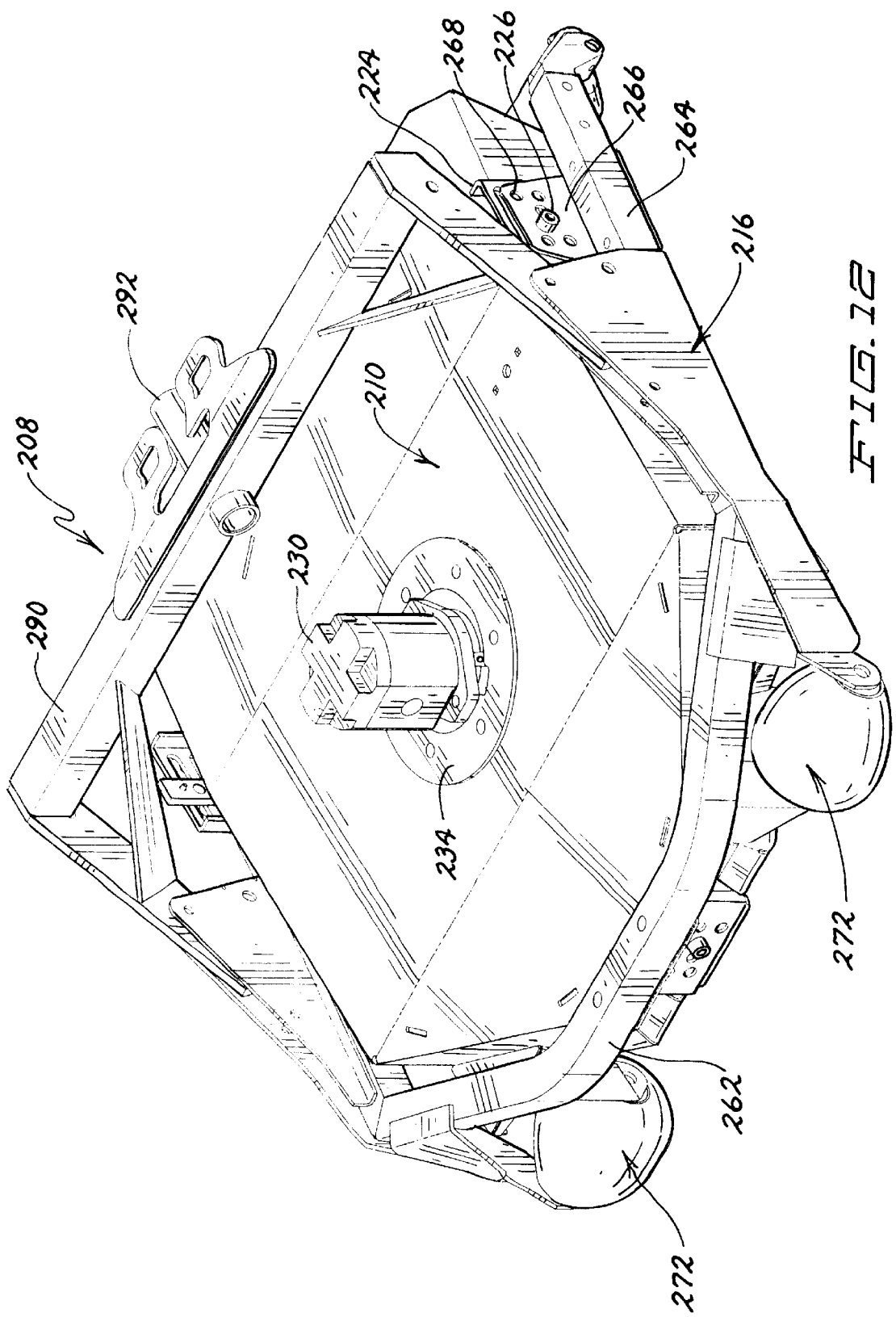
FIG. 12 is a perspective view of a rotary cutting unit used on the mower of FIG. 11.
Figure 13:
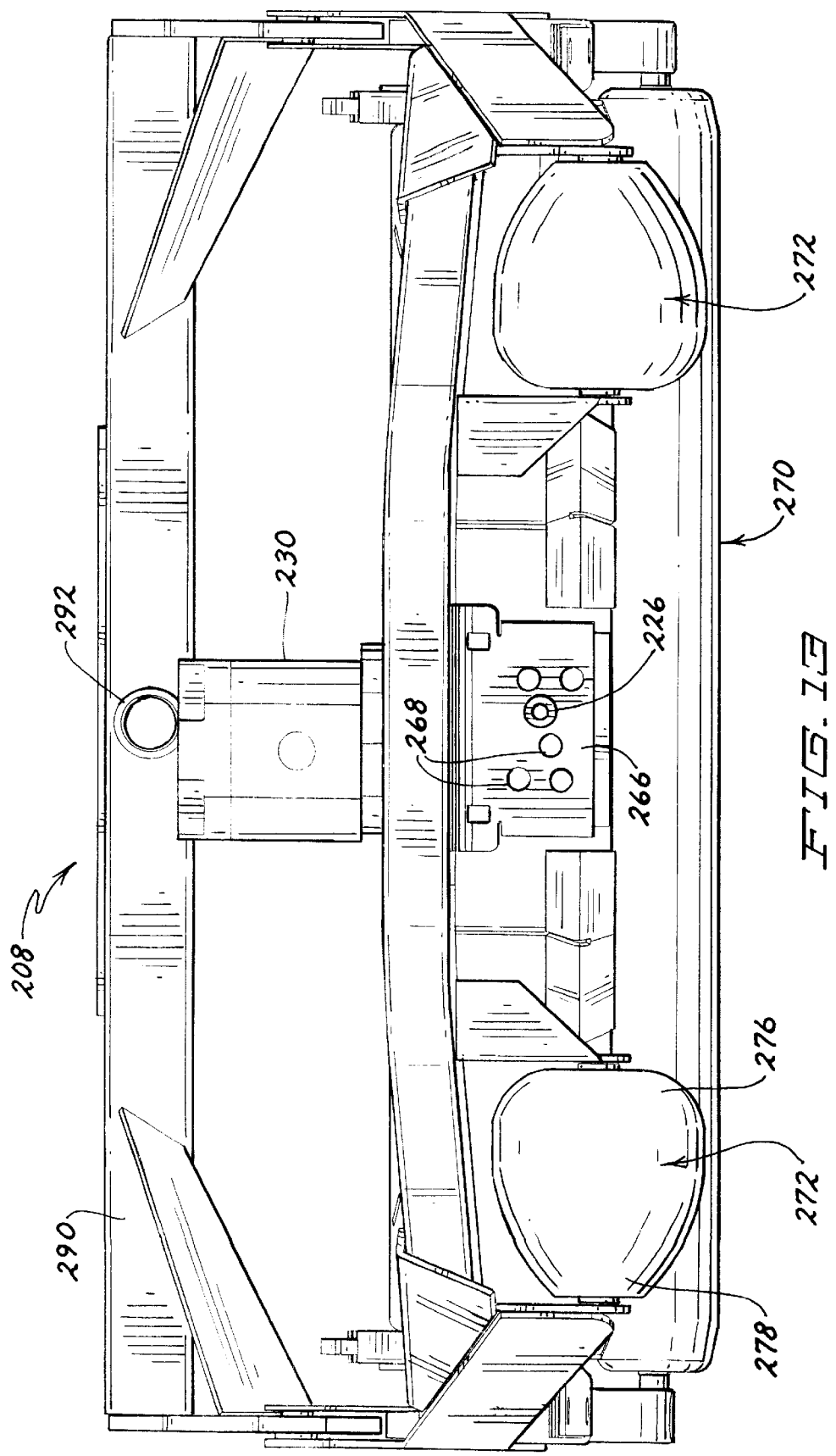
FIG. 13 is a front elevational view of the rotary cutting unit shown in FIG. 12.
Figure 14:
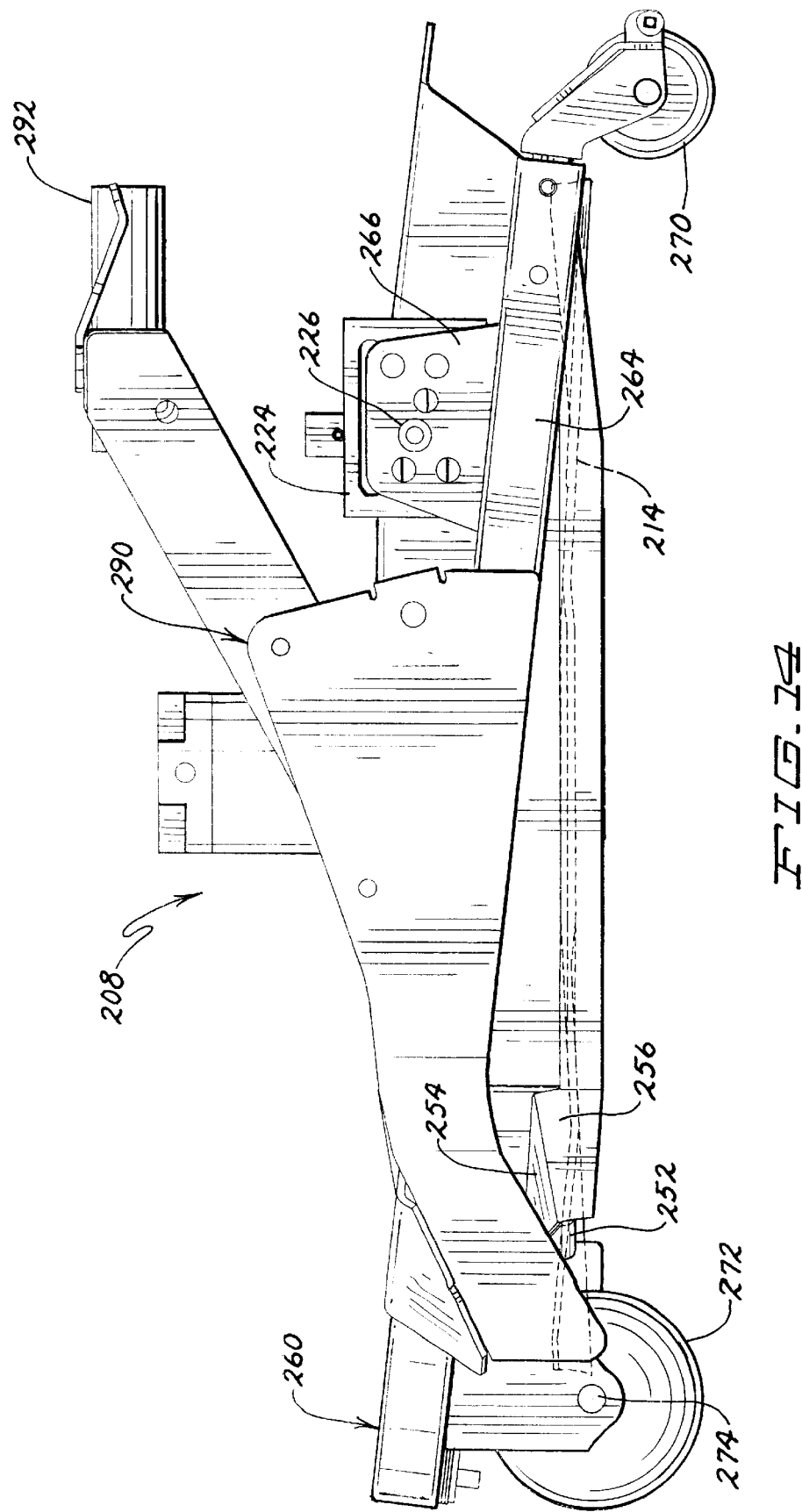
FIG. 14 is a side elevational view of the rotary cutting unit shown in FIG. 12.
Figure 15:
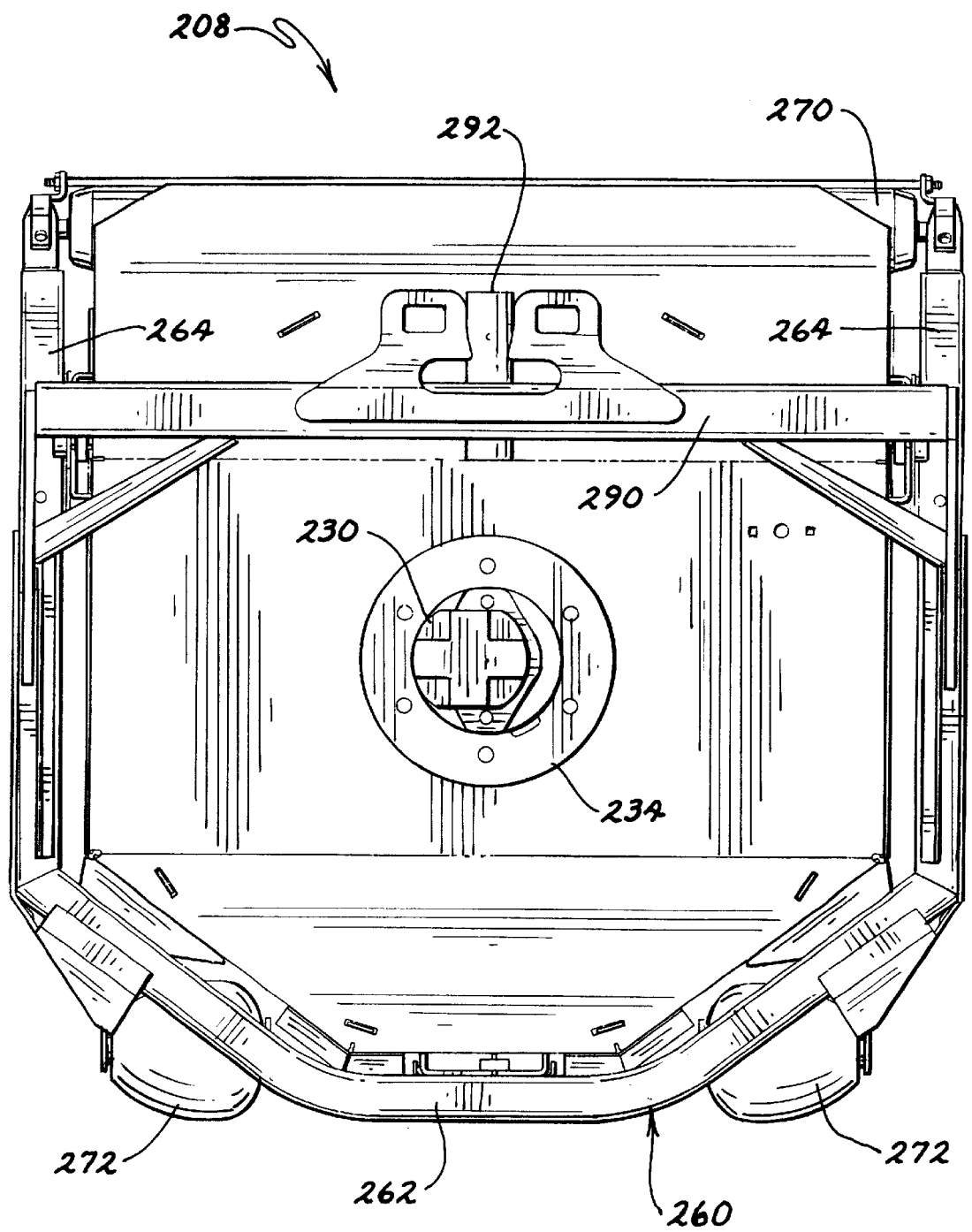
FIG. 15 is a top plan view of the rotary cutting unit shown in FIG. 12.

In addition to providing increased lateral offset for trimming around boundaries, the trim mower of the present invention offers other advantages. For example, when mowing inclined surfaces as shown in FIG. 10, the cutting units can be laterally offset to partially shift the mower's weight to the uphill side. Additionally, servicing of rear cutting unit 108b is simplified as it can be partially extended from beneath vehicle 102, allowing improved accessibility.

While the preferred embodiment described above utilizes a hydraulic carrier cylinder, Applicants perceive an alternative embodiment where carrier frame 144 would be manually displaced. That is, scissors frame 146, carrier cylinder 158, and the related hydraulics would be replaced with a manual clamp (not shown) which would restrain carrier frame 144 relative to support frame 137. This embodiment would require that the operator stop the vehicle with the cutting units in their transport position, manually release the clamp, manually reposition carrier frame 144 along frame members 142, and re-clamp the carrier frame in its new position. While this embodiment does not offer the dynamic adjustability present in the preferred embodiment, it does allow the cutting units to be periodically offset as mowing needs require.

Still yet another embodiment contemplated would replace scissors frame 146, carrier cylinder 158, and the corresponding hydraulics with a ball screw actuator (not shown) spanning the undercarriage of the vehicle. Carrier frame 144 would be modified to operably connect to the screw, thus allowing dynamic lateral positioning of the cutting units. This screw would be powered either by an electric motor (not shown) or by an additional hydraulic motor (also not shown).

A second embodiment of a mower according to this invention is illustrated in FIGS. 11–19. In this second embodiment, the three reel type cutting units 108 shown in FIGS. 1–10 are replaced by three rotary cutting units 208. The system for laterally displacing rotary cutting units 208 is the same as the system used to laterally displace reel type cutting units 108. Namely, all three rotary cutting units 208 can be displaced to one side or the other from a normal, generally centered orientation on vehicle 102 using the same cutting unit carrier system shown in FIG. 2. The primary difference between the first and second embodiments of the mower according to this invention is the nature of the cutting units themselves, namely the use of rotary cutting units 208 rather than reel type cutting units 108.

A rotary cutting unit 208 of the type which may replace one of the three reel-type cutting units 108 is shown in FIGS. 11–19 and will be more fully described hereafter. The description of this one rotary cutting unit 208 will serve to describe the other rotary cutting units 208 as all of the cutting units are generally identical. Again, since one rotary cutting unit 208 will replace each of the reel-type cutting units 108 shown in FIGS. 1–10, there will be two front rotary cutting units 208a in advance of each front wheel 104 of vehicle 102. A third, rear cutting unit 208b will be placed beneath vehicle 102 generally between the front and rear wheels of vehicle 102. The rear cutting unit 208b will extend between and cover the gap that exists between the front cutting units 208a such that all three cutting units 208a and 208b will cut an unbroken swath of grass. Again, this staggered and overlapped orientation of rotary cutting units 208 is the same as shown for reel type cutting units 108 shown in FIGS. 1–10, except that now the cutting units are rotary cutting units.

Each rotary cutting unit 208 comprises two major components that are normally fixed together during operation of the cutting unit, but are detachable from one another to change the cutting height. The first of these components comprises a cutting deck 210 which provides a cutting chamber 212 in which a generally horizontal cutting blade 214 is contained. Cutting deck 210 also mounts a motive means for rotating blade 214 in a substantially horizontal cutting plane. The other of these components includes a roller frame 216 that mounts various ground engaging rollers. When roller frame 216 is fixed to cutting deck 210, cutting deck 210 is self-supporting on the ground and can roll over the ground by virtue of the various rollers on roller frame 216. The height of cut of rotary cutting unit 208 can be adjusted by changing or adjusting the position of roller frame 216 relative to cutting deck 210 when the two are affixed together.

Cutting deck 210 of each rotary cutting unit includes a downwardly facing cutting chamber 212 which is defined by a circular shroud wall 220 that extends downwardly from a top wall 222. As is well known in rotary cutting decks, this wall arrangement provides a generally enclosed cutting chamber 212 which is enclosed over the sides and top thereof but is open at the bottom thereof. A rotary cutting blade 214 is carried inside this cutting chamber 212 and rotates in a generally horizontal cutting plane about a generally vertical rotational axis. Cutting blade 214 has sharpened cutting edges which cut the grass as blade 214 rotates in its cutting plane. The height of cut is determined by how far blade 214 is positioned above the ground which is, in turn, determined by the relative position of cutting deck 210 on roller frame 216.

The circular shroud wall 220 of cutting deck 210 can be generally continuous and unbroken so that cutting deck 210 acts as a mulching deck. In other words, grass clippings within cutting chamber 212 will exit the chamber only through the open bottom of cutting chamber 212. However, shroud wall 220 could be also provided with a grass discharge opening to allow grass clippings to exit through shroud wall 220 in some desired direction, i.e. to the side of cutting deck 210 or preferably to the rear of cutting deck 210. Thus, whether cutting deck 210 is a mulching deck or a side or rear discharge deck is not important to this invention.

In addition, cutting deck 210 can have other walls secured to shroud wall 220 for various purposes. For example, the front and sides of cutting deck 210 are desirably flat to carry slotted attachment brackets 224 that are adjustably mated to attachment pins 226 on roller frame 216. The flat front and flat sides of cutting deck 210 are provided by other straight, flat walls 228 that are secured to the front and sides of circular shroud wall 220. See FIG. 18. In addition, top wall 222 extends rearwardly past circular shroud wall 220 to further unite and join the straight, flat walls 228 that are secured to the sides of circular shroud wall 220.

A means for rotating the cutting blade within cutting chamber 212 is provided on cutting deck 210. This rotating means comprises an individual electric or hydraulic motor 230. Preferably, cutting deck 210 includes a series of bolt holes 232 to which a motor mounting ring 234 can be bolted. When so mounted and when energized, the shaft of motor 230 is suitably connected to blade 214 to rotate blade 214 in its horizontal cutting plane. Alternatively, the blade rotating means could comprise a drive spindle mounted on cutting deck 210 that could be belt driven from a power takeoff shaft or the like. However, since rotary cutting unit 208 is free to pivot and tilt during operation of the mower to conform to the ground contours in the same manner that the reel-type cutting units 108 could pivot and tilt, the use of a belt driven spindle as the blade rotating means is not preferred due to the problems involved in keeping proper tension and alignment on the belt. These problems are avoided by using an electric or hydraulic motor 230 as the blade rotating means.

Figure 16:
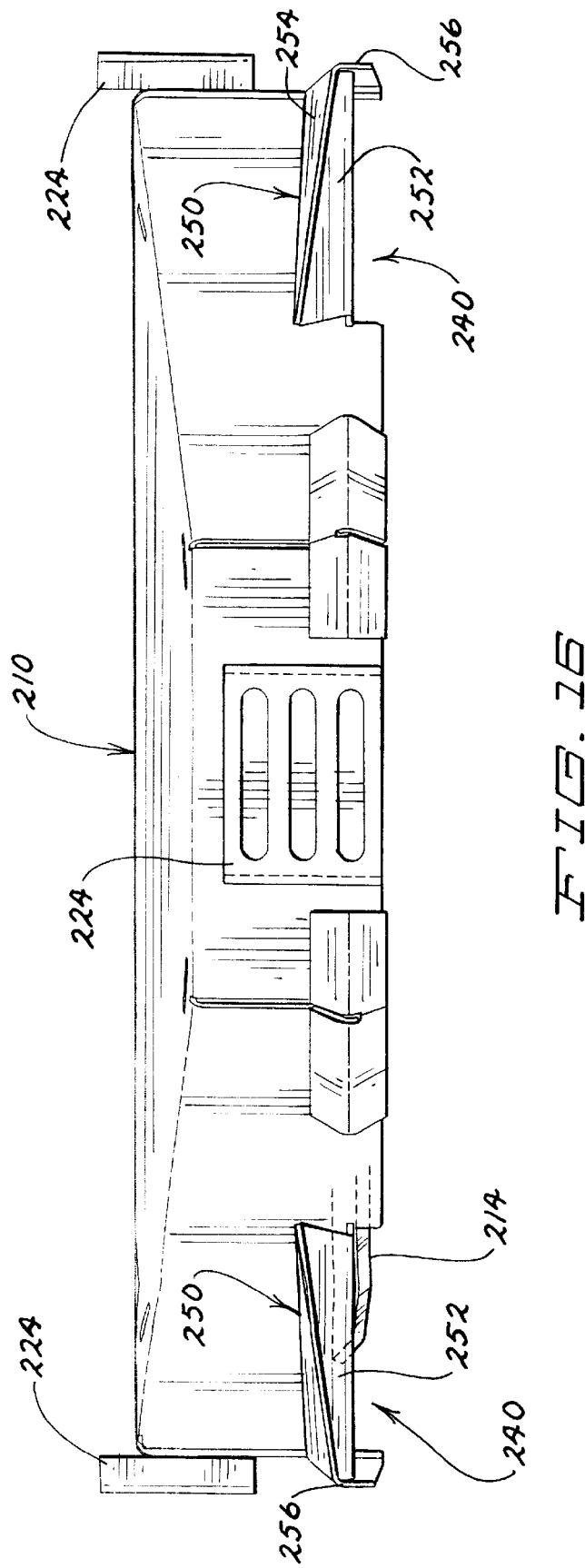
FIG. 16 is a front elevational view of a portion of the cutting unit shown in FIG. 12, namely a front elevational view of the cutting deck with the roller frame having been detached from the cutting deck such that the cutting deck is illustrated by itself.
Figure 17:
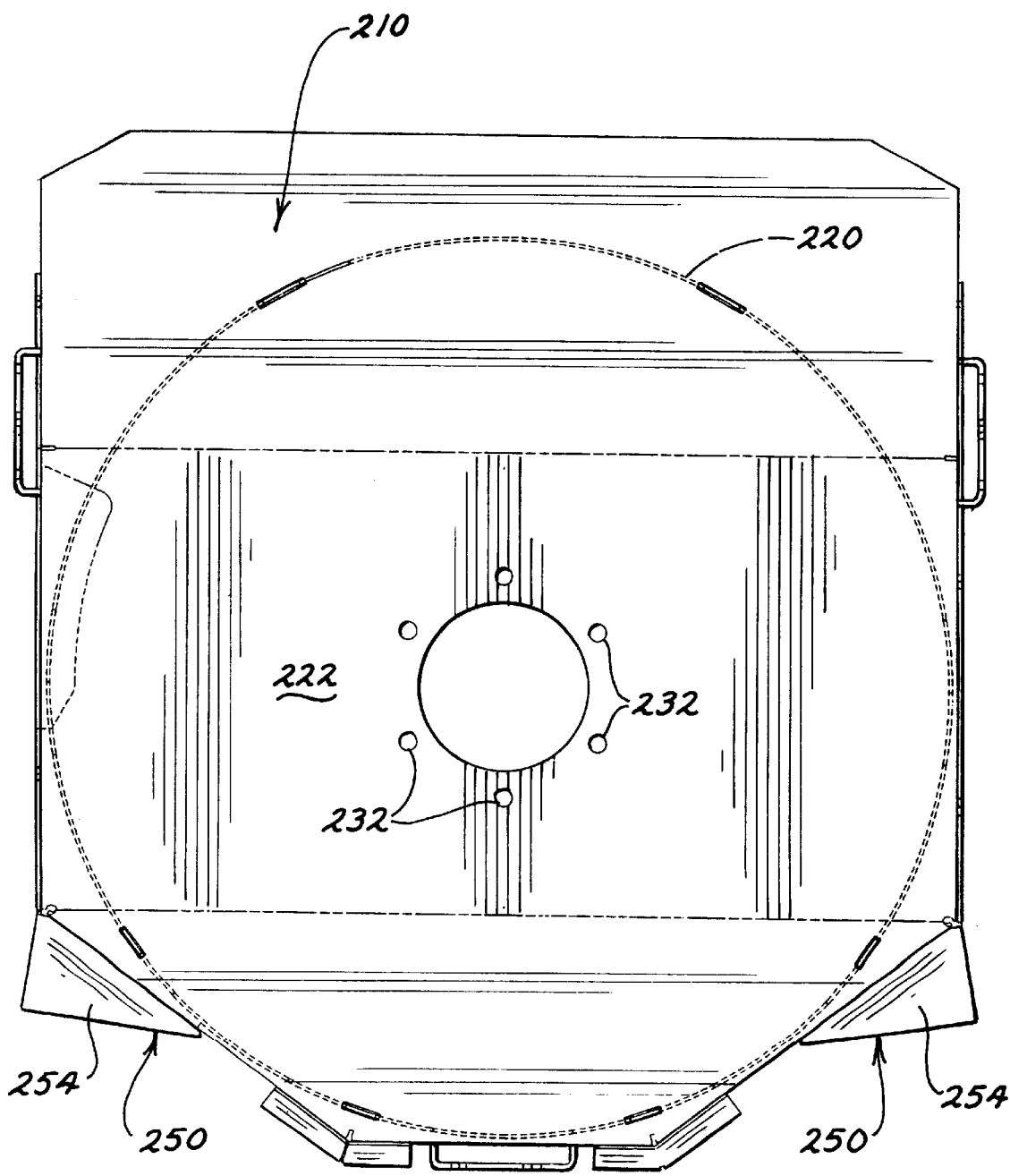
FIG. 17 is a top plan view of the cutting deck portion, shown in FIG. 16, of the cutting unit.
Figure 18:
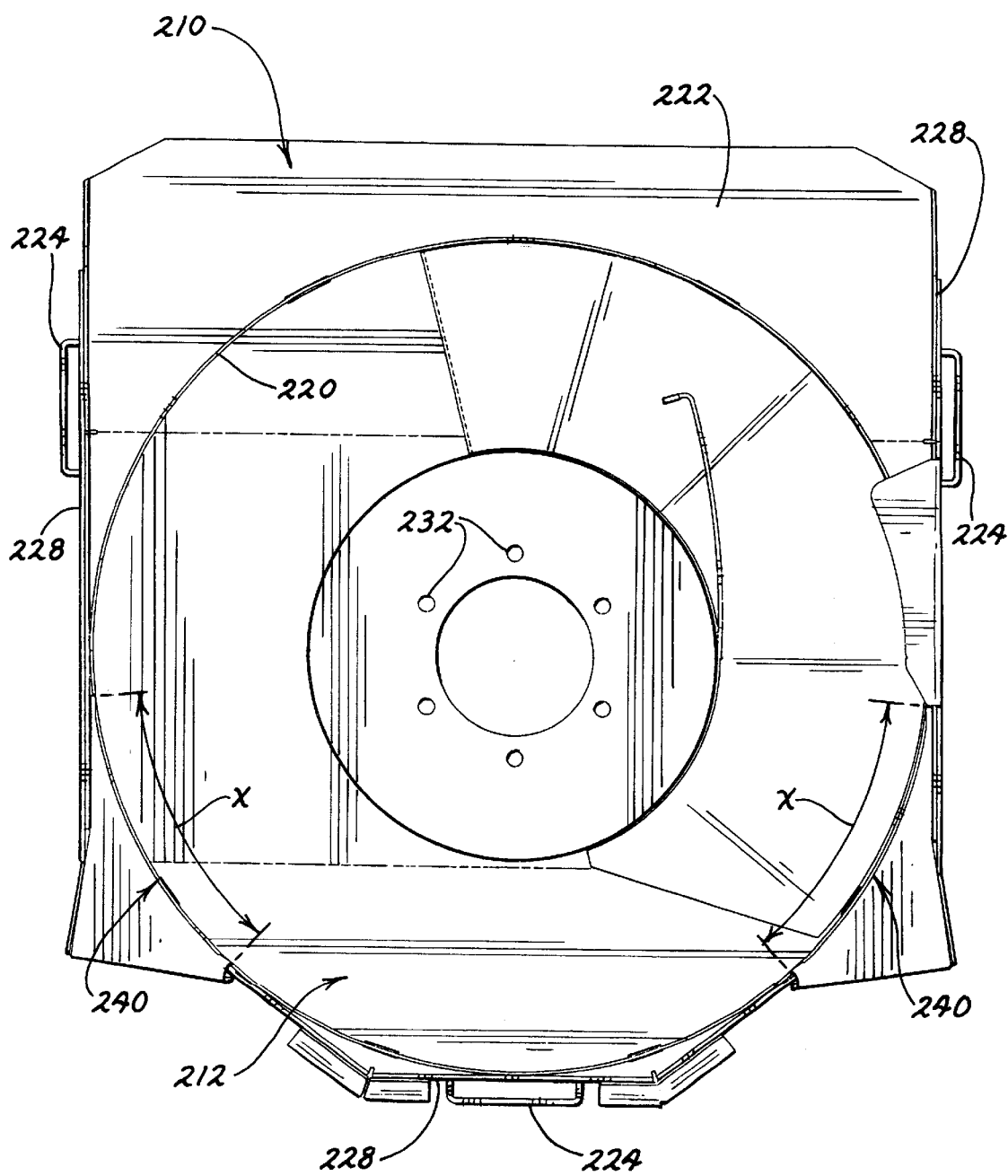
FIG. 18 is a bottom plan view of the cutting deck portion, shown in FIG. 16, of the cutting unit.
Figure 19:
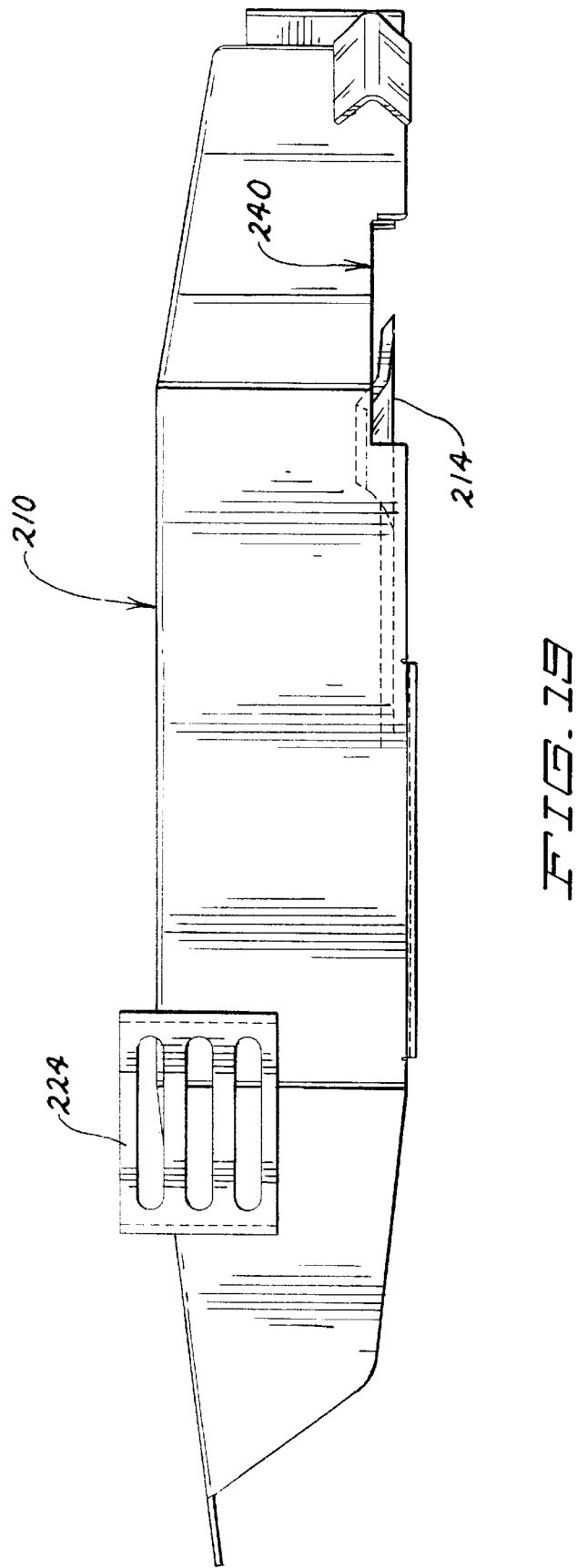
FIG. 19 is a side elevational view of the cutting deck portion, shown in FIG. 16, of the cutting unit, with the baffles having been removed from this view to better illustrate one of the front corner cut-outs of the cutting deck.

Shroud wall 220 of the rotary cutting deck has a cut-out 240 adjacent each front corner of cutting deck 210. By a cut-out, it is meant that shroud wall 220 is cut away adjacent its lower edge to expose the sharpened cutting edge of blade 214 when the tip of blade 214 travels past cut-out 240. Referring now to FIG. 18, each cut-out 240 has an angular extent of about 45° designated by the arc labelled as x and is positioned on the front corner of cutting deck 210 so that uncut, standing grass approaching each front corner of cutting deck 210 will encounter or pass into one of cut-outs 240. As shown in FIGS. 16 and 18, blade 214 is exposed to the uncut grass in cut-out 240. Otherwise, in the front of cutting deck 210 between cut-outs 240, blade 214 is hidden or enclosed by the walls which define the front of cutting deck 210.

Cutting deck 210 includes baffles 250 adjacent each of the front corner cut-outs 240 for helping guide standing, uncut grass into cut-outs 240. Each baffle 250 comprises a generally upright, triangular, first baffle surface 252 that is widest at the innermost portion of cut-out 240 and decreases in height towards the outside of cutting deck 210. This upright, triangular, first baffle surface 252 is secured to the sides of cutting deck 210 by an upper triangular support flange 254 having an outermost, vertical side 256 that wraps down over the outermost end of the triangular, first baffle surface 252. The outermost, vertical side 256 of the triangular support flange 254 extends rearwardly to join with the side walls of cutting deck 210. The outermost side 256 of the triangular support flange 254 is beneath the level of blade 214 and of the bottom of the triangular, first baffle surface 252. See FIG. 16.

Thus, referring again to FIG. 16 which shows the front of cutting deck 210, as standing, uncut grass engages the front of cutting deck 210, the grass that engages the middle portion of the front of cutting deck will simply be bent beneath the lowermost edge of the walls of the deck in the middle portion. However, the standing, uncut grass that approaches each side of cutting deck 210 will engage the triangular, first baffle surface 252 adjacent each of the front cut-outs 240. This first baffle surface 252 will tend to bend the grass smoothly down into the front cut-out 240 where the grass can be cut without being bent to one side of cutting deck 210, the grass being further confined by the outermost side 256 of the triangular support flange 254.

When rotary cutting decks 208 are arranged in a staggered orientation as in the mower of this invention, the Applicants have noticed a streaking effect along the lines where the rear cutting deck overlaps with the front cutting deck. This streaking effect is especially prevalent when vehicle 102 is turning or traversing slopes. However, when cutting decks 210 are equipped with the front corner cut-outs 240 and adjacent baffles 250 as described and illustrated herein, streaking occurring between cutting decks 210 is substantially eliminated or reduced.

As noted earlier, cutting deck 210 by itself comprises only one component of rotary cutting unit 208. To form a complete rotary cutting unit 208, cutting deck 210 has to be united with a roller frame 216. Roller frame 216 and its attached rollers will now be described.

Roller frame 216 comprises a generally U-shaped arch 260 defined by a front rail 262 secured to two, rearwardly extending side rails 264. The width of the U-shaped arch 260, i.e. the distance between side rails 264, is wide enough to allow cutting deck 210 to be positioned within roller frame 216. Each rail 262, 264 of the U-shaped arch has an apertured attachment flange 266 that carries a plurality of holes or apertures 268 for receiving an attachment pin 226. Each attachment flange 266 on one of the rails overlies one of the slotted attachment brackets 224 on cutting deck 210 so that pin 226 can pass through a selected aperture 268 and a selected slot to affix roller frame 216 and cutting deck 210 together. The height of cutting deck 210 on roller frame 216 can be adjusted by changing which aperture and which slot receive attachment pin 226. This is how the height of cut of the cutting unit is adjusted.

The U-shaped arch 260 includes a single, rotatable ground engaging roller 270 at the rear of side rails 264 behind cutting deck 210 when roller frame 216 and cutting deck 210 are united with respect to one another. This single ground engaging roller 270 extends all the way between side rails 264 over the full width of cutting deck 210. In addition, two, front, ground engaging rollers 272 are used on front rail 262 of arch 260 adjacent each corner of cutting deck 210. These two, front rollers 272 obviously extend over a small portion of the width of cutting deck 210 as opposed to the full length rear roller 270. Rear roller 270 need not necessarily be a full length roller, but could comprise a segmented roller or two separate rollers at each rear corner of the cutting deck including two separate rear rollers shaped like the two, front rollers 272.

The front ground engaging rollers 272 have a novel ovate shape with the rotational axis 274 of roller 272 extending transversely relative to cutting deck 210 and being arranged horizontally. The broader basal end 276 of the ovately shaped roller 272 is positioned to the interior of cutting deck 210 and the tapered outer end 278 of the ovately shaped roller 272 is positioned to the exterior of cutting deck 210. Roller 272 is rotatably arranged on front rail 262 of the U-shaped arch in any suitable manner.

The Applicants have found that the front ground engaging rollers 272 have numerous advantages. They are effective replacements for the traditional caster wheels that are often found on the front side of rotary cutting decks. However, front ground engaging rollers 272 are superior to caster wheels since they can be mounted closer to the front wall of cutting deck 210 than caster wheels. This reduces the distance between blade 214 and the support provided by front rollers 272 to minimize scalping and the like. However, caster wheels could be used in place of front rollers 272 if desired.

One possible disadvantage of using a front ground engaging roller 272 in place of a caster wheel is the tendency of such a roller to slide on the turf during a vehicle turn, which does not happen with a caster wheel that can freely pivot about a vertical axis. Such sliding is a disadvantage as it can mar or scuff the turf. However, the Applicants have found that the ovate shape of the front ground engaging rollers is effective in reducing marring or scuffing during turns. Put another way, the ovate shape of rollers 272 allows cutting deck 210 to smoothly slide over the turf during turns of vehicle 102 without marring or scuffing the turf.

In addition to the U-shaped arch 260 that mounts the front and rear ground engaging rollers 272 and 270, respectively, roller frame 216 includes a yoke 290 secured to side rails 264 of the arch. This yoke 290, and particularly an elongated rod 292 on the yoke, is how rotary cutting unit 208 is attached to the cutting unit carrier system shown in FIG. 2. Each rod 292 slips into one of the stem pivots 136 in the same manner as the reel-type cutting units.

Rotary cutting units 208 as disclosed herein when used to replace the reel-type cutting units 108 shown in FIGS. 1–10 will provide another embodiment of a mower with laterally adjustable cutting units. Thus, the operator by using the joystick 118, can selectively laterally displace the three cutting units 208a and 208b so that the cutting swath provided by those cutting units shifts to one side or the other. This is accomplished even considering the fact that the cutting units 208 can be rolled on the ground by their own ground engaging rollers 270 and 272 and can pivot and tilt during operation of the mower to follow the ground contours. Thus, the second embodiment of this invention forms an effective trim mower like that shown in the first embodiment of the invention.

However, rotary cutting units 208 are not limited to use in a trim mower in which the cutting units 208 can be laterally displaced, but could be used as part of other mowers. For example, a cutting unit 208 having the disclosed ovately shaped, front, ground engaging rollers 272 would be useful in other applications. A cutting unit 208 with front corner cut-outs 240 would be useful in eliminating streaking between multiple cutting units even if the cutting units did not shift or were arranged in a different staggered pattern.

In addition, various other modifications will be apparent to those skilled in the art. For example, the bolt holes 232 provided in cutting deck 210 for bolting the motor and blade combination to the deck in a single position could be replaced with slots (not shown) that are elongated in a fore and aft direction relative to the deck. Such slots would allow the position of blade 214 in cutting chamber 212 to be adjusted from a centered position to a non-centered position, i.e. to a position where blade 214 is shifted either forwardly or rearwardly in cutting chamber 212 to provide more clearance at the rear or in the front of cutting chamber 212, respectively. This adjustment would be made by sliding the bolts of the motor mounting ring either forwardly or rearwardly in the slots before the bolts are secured. Shifting the motor/blade combination towards the front allows for more efficient mulching of clippings while shifting the motor/blade combination to the rear provides a much smaller mulched clipping. Thus, the use of the aforementioned slots to allow a fore and aft shifting of the motor/blade combination is useful primarily in cutting decks in which the cutting chamber can be enclosed to mulch the clippings.

Thus, the scope of this invention is to be limited only by the appended claims.

We claim:

1. A triplex mower comprising:
   a) a traction vehicle supported by at least one front wheel and at least one rear wheel;
   b) a lateral support frame operably mounted to the traction vehicle;
   c) a pair of front cutting units located generally ahead of the at least one front wheel;
   d) a rear cutting unit located generally between the at least one front wheel and the at least one rear wheel and positioned substantially between the front cutting units, wherein the front and rear cutting units collectively define a cutting swath which is normally disposed in a first orientation relative to the traction vehicle;
   e) a lateral carrier assembly operably connecting the front and rear cutting units to the lateral support frame, wherein the lateral carrier assembly can move laterally relative to the support frame;
   f) a positioning apparatus for positioning the lateral carrier assembly relative to the support frame to selectively laterally displace the front and rear cutting units relative to the traction vehicle to shift the cutting swath defined by the cutting units to at least one side of the first orientation of the cutting swath, whereby the traction vehicle can be operated with the cutting swath disposed in its first orientation or in at least one other selected orientation that is laterally displaced from the first orientation; and
   g) a restraining apparatus for restraining the lateral carrier assembly relative to the support frame.

2. The triplex mower of claim 1, wherein the positioning apparatus selectively laterally displaces the front and rear cutting units relative to the traction vehicle to shift the cutting swath defined by the cutting units to either side of the first orientation of the cutting swath.

3. The triplex mower of claim 1, wherein the mower is a trim mower.

4. The triplex mower of claim 1, wherein the positioning apparatus and the restraining apparatus are embodied in a single powered actuator.

5. The triplex mower of claim 1, wherein each cutting unit has rotatable rollers or wheels which engage the ground when the cutting unit is in a cutting position to allow the cutting unit to roll over the ground when cutting.

6. The triplex mower of claim 5, wherein the cutting units comprise rotary-type cutting units having a cutting blade which is rotated in a substantially horizontal cutting plane.

7. The triplex mower of claim 5, wherein the cutting units comprise reel-type cutting units.

8. A triplex mower comprising:

a) a traction vehicle;

b) first and second cutting units carried on the traction vehicle with the first and second cutting units being longitudinally aligned with one another but being laterally spaced from one another to have a gap therebetween;

c) a third cutting unit carried on the traction vehicle, wherein the third cutting unit is longitudinally spaced from the first and second cutting units and is located relative to the first and second cutting units to cover the gap between the first and second cutting units, wherein the cutting units collectively cut a swath as the traction vehicle is operated; and d) a single carrier frame supporting all three cutting units on the traction vehicle, wherein the carrier frame is selectively movable laterally relative to the traction vehicle to be able to laterally adjust the position of the cutting swath relative to the traction vehicle such that the traction vehicle can be operated with the cutting swath in different lateral positions.

9. The triplex mower of claim 8, wherein the first and second cutting units are placed forwardly of the third cutting unit on the traction vehicle.

10. The triplex mower of claim 8, wherein the traction vehicle has a plurality of ground engaging wheels supporting the traction vehicle for movement over the ground, the ground engaging wheels comprising at least one front wheel and at least one rear wheel, and wherein the first and second cutting units are placed forwardly of the at least one front wheel and the third cutting unit is placed between the at least one front wheel and the at least one rear wheel.

11. The triplex mower of claim 8, further including a powered actuator carried on the traction vehicle and connected to the carrier frame for providing powered lateral movement of the carrier frame.

12. The triplex mower of claim 11, further including a control carried on the traction vehicle which control is manipulable by an operator of the traction vehicle to selectively actuate the powered actuator during operation of the traction vehicle.

13. The triplex mower of claim 11, wherein the cutting units are supported by rollers or wheels for rolling over the ground.

14. The triplex mower of claim 11, further including a lift and lower system on the carrier frame for lifting and lowering the cutting units relative to the carrier frame to place the cutting units in a lowered cutting position or a raised transport position.

15. The triplex mower of claim 8, wherein the mower is a trim mower.

16. A mower comprising:

a) a traction vehicle;

b) a plurality of cutting units carried on the traction vehicle which cutting units collectively cut a swath of grass as the traction vehicle is operated, wherein each cutting unit is independently connected to the traction vehicle by at least one pivot to permit each cutting unit to tilt or rock relative to the traction vehicle independently of the other cutting units when following at least some changes in ground contour; and c) wherein the cutting units are selectively movable laterally relative to the traction vehicle to be able to laterally adjust the position of the cutting swath relative to the traction vehicle such that the traction vehicle can be operated with the cutting swath in different lateral positions.

17. The mower of claim 16, wherein the cutting units comprise:

a) at least first and second cutting units carried on the traction vehicle with the first and second cutting units being longitudinally aligned with one another but being laterally spaced from one another to have a gap therebetween; and b) at least one additional cutting unit carried on the traction vehicle which is longitudinally spaced from the first and second cutting units and is located relative to the first and second cutting units to cover the gap between the first and second cutting units.

18. The mower of claim 16, wherein each cutting unit has rotatable rollers or wheels which engage the ground when the cutting unit is in a cutting position to allow the cutting unit to roll over the ground when cutting.

19. The mower of claim 16, wherein the cutting units comprise rotary-type cutting units having a cutting blade which is rotated in a substantially horizontal cutting plane.

20. The mower of claim 16, wherein the cutting units comprise reel-type cutting units.

21. The mower of claim 16, wherein the at least one pivot for each cutting unit is substantially horizontal and extends longitudinally relative to the traction vehicle substantially parallel to a forward direction of motion of the traction vehicle such that each cutting unit rolls from side-to-side in response to lateral changes in ground contour.

* * * * *